United States Patent [19]
Sissom et al.

[11] Patent Number: 5,996,529
[45] Date of Patent: Dec. 7, 1999

[54] MILK METERING AND COW ID SYSTEM

[75] Inventors: Kenneth L. Sissom, Oregon; Greg N. Hann, Stoughton, both of Wis.

[73] Assignee: Dairy Creations, Inc., Oregon, Wis.

[21] Appl. No.: 09/006,323

[22] Filed: Jan. 13, 1998

[51] Int. Cl.⁶ ..................................................... A01J 5/00
[52] U.S. Cl. ..................................................... 119/14.14
[58] Field of Search ........................... 119/14.01, 14.02, 119/14.03, 14.08, 14.14

[56] References Cited

U.S. PATENT DOCUMENTS

| | | | |
|---|---|---|---|
| 4,517,563 | 5/1985 | Diamant | 340/825.54 |
| 4,532,892 | 8/1985 | Kuzara | 119/51 R |
| 4,537,150 | 8/1985 | Bowers | 119/14.17 |
| 4,548,161 | 10/1985 | Reisgies et al. | 119/14.17 |
| 4,617,876 | 10/1986 | Hayes . | |
| 5,028,918 | 7/1991 | Giles | 340/825.54 |
| 5,083,459 | 1/1992 | Lind et al. . | |
| 5,183,008 | 2/1993 | Carrano . | |
| 5,628,284 | 5/1997 | Sheen et al. . | |
| 5,635,637 | 6/1997 | Boult et al. . | |
| 5,644,643 | 7/1997 | Scofield et al. | 119/840 |
| 5,743,209 | 4/1998 | Bazin et al. . | |
| 5,767,080 | 6/1998 | Beck et al. | 119/174 |
| 5,803,015 | 9/1998 | Rhodes et al. | 119/14.02 |

OTHER PUBLICATIONS

Dairy Creations, Inc., "Easy Technology", product brochure, Feb. 1996.

*Primary Examiner*—Thomas Price

[57] ABSTRACT

A system for use in a milking parlor having a plurality of stalls is disclosed. The system both monitors milk production and identifies each of a plurality of animals being milked. The system includes a plurality of milk metering subsystems for each of which is assigned to one of a plurality of stalls. The milk metering subsystem senses the temperature of milk and/or wash flowing through the milk metering subsystem. A host computer manages both the flow of data throughout the system and the operation of the milk metering subsystems by way of a remotely located system interface between the computer and each of the milk metering subsystems. An RS-485 connection between each of the plurality of milk metering subsystems and system interface is included. The system also includes at least one antenna which receives animal identification data for each of the animals being milked and electrically communicates that identification data the host computer. The system further includes a plurality of transponders one located on an ear of each monitored animals, and a receiver for each stall. Milk production data is automatically transferred to the host computer after the expiration of a time period following a triggering event, at the end of a shift, or on demand.

50 Claims, 12 Drawing Sheets

MILK METERING AND COW ID SYSTEM

FIELD OF THE INVENTION

The present invention relates generally to dairy farming. More specifically, it relates to systems used to identify and monitor the milk production of cows.

BACKGROUND OF THE INVENTION

Accurate measuring and recording the productivity of cows within a herd is important in dairy farm management. Known systems attempt to identify a cow being milked, and measure the amount of milk that cow produces as it is being milked. Additionally, systems record that data (typically through micro processors etc.) so that the data may later be analyzed and used to manage the herd.

Some prior art ID systems include an ID transponder mounted on a neck band worn by the cow. The prior art transponders were either active (battery operated) or passively activated by an antenna. The ID transponders interacted with a walk through antenna typically, mounted at the door of the milking parlor. As the cow passed through the parlor door, the antenna (which cooperated with a controller) sensed the ID transponder. Data transmitted by the tag identified the cow. The cows were placed in stalls in the order they passed through the door. Each stall had a milk meter to measure the milk obtained from the cow in that stall. The controller matched the data from each milk meter with a cow based on the ID data transmitted and the order the cows entered the parlor. Thus, if a cow was in advertently placed in the wrong stall (i.e. out of sequence) then the milk metered is not properly matched with the cow that produced the milk. Also, neck tags and the associated antenna were relatively expensive.

Other prior art identification systems included a leg or a neck band with an antenna in each stall. This avoided the problem caused by placing the cow in the incorrect stall, but created other problems. Unfortunately, the antennas and tags were expensive (and one per stall was required). Moreover, the antennas would often detect more than one cow as the cows move in the stall. Thus, prior art systems need a system to determine which signal was the correct signal. Additionally, in order to reliably detect the tags, which may be of varying distances from the antennas, the frequency needed to be relatively high. Often, FCC regulations prevented the frequency from being sufficiently high. Thus, this system avoided placing the cow in the wrong stall, but still allowed for errors because the antennas sensed adjacent cows. Accordingly, a system that can identify cows within the stall, yet be accurate and inexpensive is desired.

The prior milking systems generally included a flow meter located between the claw and the milk line that provided data to a controller and data storage device such as a microprocessor mounted in a box in the milking parlor. An interface between the meter and a computer (the controller) was usually provided. The interface received data from the sensor, and translated the received data into data which could be input to the computer. Data was provided to the computer on an RS232 data line, which typically required the computer to be within 50 feet of the interface, and thus had to be located near the parlor.

One significant disadvantage of the prior art systems is that the control circuitry was located in the relatively harsh environment of the parlor—milking parlors are frequently washed with high pressure washers. The high pressure water could damage or destroy the electronics, and often lead to electrical failure of the control circuitry. Also, modern dairy farm managers often have offices located remotely from the milking parlors, and the prior art systems did not allow them to access the milking data from their offices. Accordingly, a system that locates the computer and the control circuitry remotely from the parlor, where the environment may be controlled, and the data accessed by the manager, is desirable.

A controller was designed to interface with stalls on two sides of a parlor. However, some modern parlors have more than two "sides" of stalls. Because prior art interfaces do not provide for more than two "sides" multiple controllers were required. Accordingly, an interface that provides for interfacing with more than two sides is desired.

Prior art metering systems included a temperature sensor to measure the milk temperature. Another temperature sensor was needed to measure the wash temperature. It is desirable to measure milk temperature to determine when a cow is fertile and/or ill. The wash temperature refers to measuring the temperature of a solution used to periodically clean the milking system. Due to health concerns it is necessary to frequently wash a milking system, including running a detergent-like solution through the meters, lines and etc. The wash fluid temperature must be monitored to insure that it is hot enough to properly sanitize the system.

Prior art systems used a discrete sensor in the line (after the meter) to measure the milk temperature. A separate probe, located in the wash vat, measured the temperature of the wash. The system was thus more expensive and complicated because a meter and two distinct temperature probes were used. Moreover, the temperature probe located in the wash vat did not measure the temperature of the solution in the lines—but only in the vat. Thus, the temperature in the lines could be too low, while the vat temperature was high enough. This problem was exacerbated because the wash vat was often located in a room remote from the milking parlor. Accordingly, a system that includes a single temperature probe, in line and capable of measuring both milk and wash temperatures, is desired.

Prior art milk metering systems typically included a key pad which was located near the cow being milked (or portable) on which a-variety of information, such as cow-id, could be entered.

Prior art controllers had other drawbacks. For example, the wash time parameters were not easily set by the user. Also, data accumulated for a milking session was only downloaded to the data storage device at the end of the shift (when the cow or cows exited the stall). Accordingly, it is desirable to have a system with flexible data handling, such as easily setting wash time parameters, and downloading data when desired.

Prior art systems also had relatively large sensors, moving parts and vacuum restrictions. The large sensor made the meters undesirably bulky, the moving parts were prone to breaking, and the vacuum restrictions causes milking difficulty. Accordingly, a meter that has a small sensor, no moving parts, and no vacuum restrictions is desirable.

SUMMARY OF THE PRESENT INVENTION

According to one aspect on the invention a multiple meter controller or interface capable of interfacing with four sides of a milking parlor is provided.

The meters include a temperature sensor that measures the temperature of, preferably, both the milk and the wash. The temperature sensor is located in the meter in one embodiment.

A host computer has data entry and storage capacities that include allowing the user to set various parameters related to the wash time. Data can be entered through an alphanumeric or numeric keypad in another embodiment. Data can be stored on user prompt, not merely at the end of each shift.

The system includes an identification system in one embodiment. Ear tags are provided for each animal, and the ear tags are sensed by antennas located in each stall.

The controller, host computer, and/or other system electronics may be located remote from the milking parlor, in a controlled environment, and accessible by the dairy manager, in one embodiment.

Other principal features and advantages of the invention will become apparent to those skilled in the art upon review of the following drawings, the detailed description and the appended claims.

Figure 1:
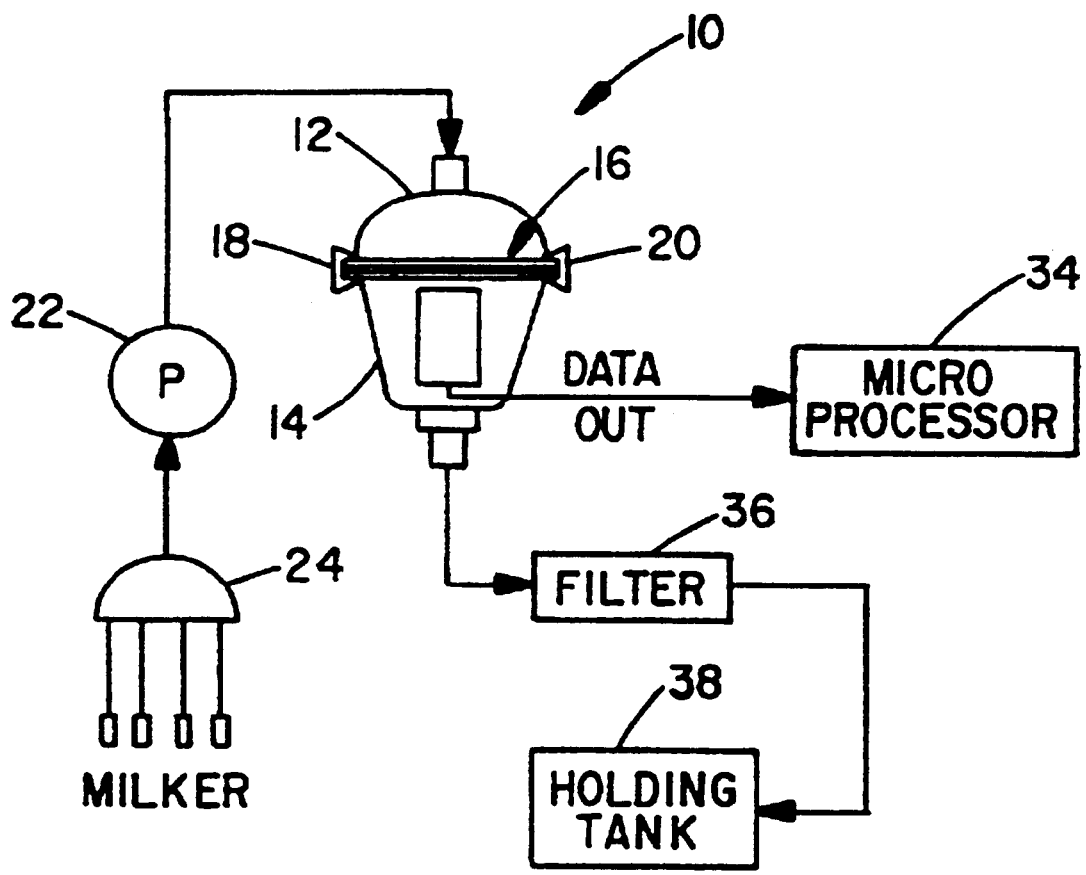
FIG. 1 is a block diagram of a milking system which incorporates a flow meter used in the preferred embodiment of the present invention.

Before explaining at least one embodiment of the invention in detail it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting. Like reference numerals are used to indicate like components.

DETAILED DESCRIPTION OF THE PREFERRED EMBODIMENTS

While the present invention will be illustrated with reference to a particular system and system components, it should be understood at the outset that the invention may be implemented using fewer than all of the described components and using alternative components.

The present invention is directed toward a system for operating a milking parlor. This description describes a modular set of hardware and software building blocks from which a variety of milking parlor configurations can be constructed.

The supported parlor configurations include: Parallel, Herringbone, Flat Barn, Rotary, Stanchion and virtually any configuration that could be constructed using the building blocks described herein.

Generally, the invention includes a system for identifying cows and monitoring the milk production of the identified cows. Identification is made, in the preferred embodiment, using an ear tag transponder 800 on each cow and an antenna 603 in each stall. The cows are thus accurately and uniquely identified in the stall in which they are to be milked.

A system includes a meter or sensor 305, a meter circuit board 303 which interfaces with the meter 305 and provides data to a controller 500, a multiple meter controller 500 that receives data from the meter circuit board 303 and provides it to a host computer 400. The multiple meter controller 500 is preferably capable of interfacing with at least two, preferably four, sides of a milking parlor. Also, the multiple meter controller 500 is preferably located remote from the parlor, such as near the computer 400. The sensors 305 include a temperature sensor (not shown) that measures the temperature of, preferably, both the milk and the wash. The temperature sensor is preferably located in the sensor 305 in one embodiment.

Throughout this description, references are made to the Cow Id. There are actually two Cow Id numbers. The first a sixteen hex digit transponder code Id (transponder Id) read by an Electronic Identification Reader (ID-R) 600. The second is a six digit Id as defined by the particular installation (herd Id). The Id shown on a milk metering subsystem display 301 is a herd Id which may be entered manually at a keypad 302 or is returned to a metering subsystem 300 from a host computer 400 in response to receipt of a transponder Id.

The milk metering subsystem 300 may be implemented using a modified version of the metering subsystem disclosed in and incorporated by reference in U.S. Pat. No. 5,083,459, with the addition of a piezo electric keypad 302 and an additional ID interface card 700.

The ID interface card (IDI card) 700 mounts to the component side of the meter circuit board 303 and provides a four wire RS-485 communications interface 306 and 12 volts DC power 702 for an attached Electronic ID reader 600. It also contains additional RAM program memory 703 for use by the milk metering subsystem 300.

Although shown in the preferred embodiment as one unit, it is possible to locate the electronic components 301, 302, 303 and 307 in a remote location outside the harsh environment of the milking parlor.

Electronic identification of the cow is accomplished by using an ear tag transponder 800 attached to the cow and reading the transponder with an Electronic ID reader (ID-R) 700. The ID-R 700 is a single printed circuit card 601 incorporating a TI micro reader 602 and a low Q antenna 603. Power for the ID-R is provided by the meter circuit board 303 via the IDI card 700. In walk through or cut gate Id applications, a larger antenna 603 is required.

The multiple meter controller (MMC) 500 may be implemented with the hardware of previous systems. For example, using the meter circuit board 303 to interface the ID-R 700 permits all four ports (not shown) of the MMC 500 to be used for milk meter subsystem 300 interfacing 308 and gate switch 900 interfacing 505.

A software program is used, in the preferred embodiment, to permit using any of the identification options described in this description.

The main software program also manages the milk metering subsystem 300 and identification operations to gather data about each cow being milked in order to build a file which can be imported and exported to other known software programs (milk management, herd management, etc.).

Other software programs include a stand-alone diagnostic program that can be used to check milk metering subsystem 300 and Id operation independent of the main software program and other management programs. These programs may be implemented using conventional techniques, given the functions described below.

The metering subsystem 300 may monitor milk flow, milk temperature, calculate milk weight, calculate milking time, and monitor wash time and wash temperature. The MMC 500 permits connection of multiple metering subsystems 300 each on a single communication line. In the preferred embodiment, all message exchanges operate in a polled fashion (the host computer 400 sends a command and the milk metering subsystem 300 replies), although any message exchange format could be used. Characters are transmitted as seven bit ASCII codes with even parity (in the preferred embodiment). Other embodiments use different communications protocols.

Each metering subsystem 300 is assigned, in setup mode, a device address from 0 . . . 255, and a transmission rate. Only messages at the correct rate, with an address corresponding to the correct metering subsystem 300, and containing a valid command, will be responded to, according to the preferred embodiment.

The metering subsystem 300 has a six digit display 301 in the preferred embodiment. Milk weight will be shown to tenth pounds or kilograms depending on one of two selection keys (not shown) Kgs and Lbs. Cow identification is available through manual entry on the milk metering subsystem keypad 302 (or via other data entry such as the host computer 400 communication interface in alternative embodiments).

Cow temperature is available as one alternative in the milk metering subsystem 300. The temperature is shown in tenth degrees on the display 301. Selection of Celsius or Fahrenheit follows the Kgs and Lbs selection keys (not shown). In the preferred embodiment described here the value displayed is the highest temperature read during the last or current milking, but any other temperature obtained during the last or current milking could be displayed. The temperature sensor is located in the sensor 305 in the preferred embodiment, and also is used to measure wash temperature.

Six status LEDs (not shown) are located directly above each display digit on the metering subsystem display 301. The right-most three LEDs (from right to left) indicate, in green, what information is being displayed; Milk weight, Cow Id, or Temperature. The left-most three LEDs indicate, in yellow, the status of the metering subsystem. The LEDs, from left to right, indicate: Milk flowing, Take-Off/Manual, and End of Milk. Of course other arrangements may be used, and are used in alternative embodiments, to provide status information.

At end of milking, the last milk weight will be compared to a target weight sent by the host computer 400. If the milk weight is below the target weight by a user-selectable amount, the display 301 will show LoProd alternating with the milk weight. Data downloading may be triggered by a group of cows simultaneously exiting stalls, a single cow exiting a stall, command from the keypad 302, or automatically via software control.

A SELECT key (not shown) on the keypad 302 is used to select the item being displayed. Each key pressed will select a new display item (Milk weight, Cow Id, or Temp) in a round robin fashion. A DIGIT key (not shown) on the keypad 302 is used for entry of the Cow Id on the display 301. Each key press will move the selected display digit one position to the left in a circular fashion. The selected digit will blink. The Up and Down arrow keys (not shown) on the keypad 302 change the value of the digit. The value will be accepted when the SELECT key (not shown) is again pressed. The digit may be deleted by pressing the CE key (not shown) on the keypad 302.

Metering subsystem 300 is put through a setup sequence to program the internal operating parameters in the preferred embodiment. These parameters include (in one alternative): calibration factor, start of milk delay, end of milk delay, take-off delay, production display in lbs. or kgs. and temperature in degrees F. or C. In addition, if the metering subsystem 300 is being operated with a host computer 400, the address and speed of the communications subsystem (described below) may be programmed. The setup data is preferably stored in a non-volatile memory (not shown) on the controller 303 and needs only to be set at initial installation or upon board replacement.

The communications speed is set in the preferred embodiment by setting switches on a four position miniature switch block (not shown) contained on the return circuit board 303. Switches 1 and 2 (not shown) set the operating speed of the communications subsystem (described below). Other protocols may be used to set the communication speed. The switch positions for various speeds are:

| S1 = OFF | S2 = OFF | 1200 Baud |
| S1 = ON  | S2 = OFF | 2400 Baud |
| S1 = OFF | S2 = ON  | 4800 Baud |
| S1 = ON  | S2 = ON  | 9600 Baud |

Switch 4 "ON" (not shown) enables setup mode and switch 4 "OFF" disables setup whenever the display 301 is energized by pressing the ON/OFF key (not shown) on the keypad 302.

Display 301 also indicates a calibration procedure by its display in the preferred embodiment. A default calibration for the metering subsystem 300 is displayed, in the preferred embodiment. The default can be altered by UP and DOWN arrow keys (not shown) on the keypad 302. The calibration factor can be changed in other ways, such as via the communications subsystem (described below) in alternative embodiments.

Other parameters are similarly adjusted. The SETUP key (not shown) on the keypad 302 saves the current display (current display=last set value at first entry) and advances you to the next entry. The arrow keys change the value. The display and ranges for parameters used in the preferred embodiment are given below. Of course, other parameters, and other ranges, could be used as well.

| KEYBOARD | DISPLAY | FUNCTION | CHANGES |
|---|---|---|---|
| SETUP | bEG. 60 | Start of milk delay Range = 20–180 | UP = Increase DOWN = Decrease |
| SETUP | End. 8 | End of milk delay Range = 20–180 | UP = Inarease DOWN = Decrease |
| SETUP | Ato. 3 | Auto Take-Off delay Range = 0–6 | UP = Increase DOWN = Decrease |
| SETUP | Adr. 1 | Comm. Address Range = 0–255 | UP = Increase DOWN = Decrease |
| SETUP | In LBS In HGS | Display Weight LBS. or KGS. | UP = Pounds DOWN = Kilograms |
| SETUP | tHr 2.0 | Take-off Threshold Range .1–10 | UP = Increase DOWN = Decrease |
| SETUP | EnAbLE | Temperature | UP = Enabled DOWN = Disabled |
| SETUP | In F In C | Temp. Display | UP = Deg. F. DOWN = Deg C. |
| SELECT | F - - - F XXX | Current Temp. Range = 90–115.5 | - - - = Out Range XXX = In Range |

Exiting Setup is accomplished by pressing and holding the ON/OFF key (not shown) on the keypad 302. The display 301 will indicate turn "turnOF" and then "SLEEP". Once "SLEEP" appears on the display 301 you can release the key and the display 301 will blank. Turn Switch 3 (not shown)"OFF". The above described procedures may be implemented in a conventional manner using software designed for the particular parameters.

The metering subsystem 300 will be described next, and is in a milking mode when Switches 3 & 4 on the meter circuit board 303 are in the "OFF" position. When in the milking mode and system power for the parlor is on, a keypad 302 test is active until the ON/OFF key on the keypad 302 is pushed. Pressing any of the other keys on the keypad 302 will cause its name to appear in the display 301. If the name does not appear in the display 301 it indicates that the key is defective. If more than one key on the keypad 302 is pressed at the same time it will indicate the number of closed switches on the display 301.

When the ON/OFF key (not shown) on the keypad 302 is pushed the display 301 will show the communications speed and address (b.XX.YYY) for several seconds and then "0.0" which indicates no weight. In addition the green MILK indicator LED (not shown) in the module 304 is illuminated to indicate that the display 301 is showing milk weight. The amber TAKEOFF LED (not shown) in the module 304 is illuminated to show that the takeoff solenoid (not shown) connected to the automatic takeoff card (ATO) 307 is activated. The unit is ready for milking. The first sequence discussed will be milking with no ID system present. Again, these functions may be implemented in a conventional manner using software designed for the particular parameters.

The milking operation is initiated by pressing the START key (not shown) on the keypad 302 and releasing it. The display 301 will show "START" and then "0.0" and the green MILK LED (not shown) on the module 304 is on and all other LEDs are off (if not first the milking, the END OF MILK LED and TAKEOFF LED are on). The operator can put the milking claw on the cow now that the takeoff solenoid connected to the ATO board 307 has been disabled and the vacuum solenoid connected to the ATO board 307 enabled. After the milking claw has been attached and milk flow exceeds the takeoff threshold level the amber FLOW LED on the module 304 will flash on and off indicating that milk is being metered by the sensor 305. Once a second the new weight will be displayed on the display 301. If milk flow is not established during the period of the start of milk delay, the metering subsystem 300 will start an end of milk delay and blink the amber END OF MILK LED on the module 304.

If at anytime during milking it is desirable to stop, remove the milking claw and restart milking this can be accomplished by using the MANUAL TAKEOFF/RESUME key (not shown) on the keypad 302. Pressing the MANUAL TAKEOFF key will turn "OFF" the vacuum and turn "ON" the takeoff. To start milking again press the RESUME key on the keypad 302. The takeoff will turn "OFF" and the vacuum will turn "ON". The display 301 will resume totaling from where it stopped when the MANUAL TAKE-OFF key was pressed.

During milking if the weight displayed on the display 301 is in pounds and it is desired to see how many kilograms it is, pressing the DOWN arrow key on the keypad 302 will display the weight in kilograms. When you release the key, the display 301 returns to pounds. If the display 301 had been in kilograms and it is desired to know pounds, pressing the UP arrow key on the keypad 302 will accomplish this. Pressing both the UP and DOWN arrow keys on the keypad 302 at the same time and holding them will cause the rate per minute to be displayed on the display 301 in the default units (LBS/M or KGS/M). When the keys are released, the display 301 reverts to the default units (LBS or KGS). Pressing the TOTAL key (not shown) on the keypad 302 will cause the display 301 to show the total weight that has been recorded since the display 301 was activated by the ON/OFF key (not shown) on the keypad 302. The total weight is cleared when the display 301 is turned "OFF".

During milking, the temperature (if enabled) can be viewed by repeatedly pressing the SELECT key on the keypad 302 until the TEMPERATURE LED (not shown) on the module 304 is illuminated. The temperature is displayed on the display 302 in the default units selected during setup (Degrees C. or Degrees F.). If display is in degrees Fahrenheit, pressing and holding the DOWN arrow key on the keypad 302 will show the temperature in degrees Celsius. If the display is in degrees Celsius, pressing and holding the UP arrow key on the keypad 302 will show the temperature in degrees Fahrenheit.

During milking the metering subsystem display 301 may not be turned "OFF." If the ON/OFF key on the keypad 302 is pressed the display 301 will show "BUSY." When the end of milk sequence is complete, the display 301 can then be turned "OFF."

When the milk flow drops below the takeoff threshold the END OF MILK LED (not shown) on the module 304 blinks, the FLOW LED (not shown) on the module 304 is turned off and the end of milk delay is started. If milk flow is not re-established before the end of milk delay times out, the END OF MILK LED on the module 304 will be turned "ON", the vacuum solenoid connected to the ATO 307 is turned off, the takeoff delay will be started and the TAKE-OFF LED (not shown) on the module 304 will blink. At the end of the takeoff delay the takeoff solenoid connected to the ATO 307 will be energized and the TAKEOFF LED on the module 304 turned "ON." If the temperature option is enabled temperature can be viewed by pressing the SELECT key on the keypad 302 twice until the green TEMPERA-TURE LED (not shown) on the module 304 is illuminated. The display 301 will show, in the preferred embodiment, the highest milk temperature recorded during the milking in the format selected during setup. The temperature is reset whenever the START key (not shown) on the keypad 302 is pressed.

To milk another cow, the above sequence is repeated. If this was the last animal the display 301 can be turned "OFF" by pressing and holding the ON/OFF key on the keypad 302.

In a milking parlor with computerized cow ID capabilities, the milking sequence for milking the cow may be the same as described above, but several additional pieces of information are available to the parlor operator in the preferred embodiment. The animal being milked is tracked by a transponder code ID from an ear tag transponder 800 on the cow by an antenna 603 located in each stall. The data is read into the host computer 400 by the ID-R 600 which reads the transponder ID from each cow's transponder. The host computer 400 then transmits the herd ID and a production target weight to the milk metering subsystem 300 via the communications interfaces 504 and 308. Alternative transponder/antenna systems may be used (such as a single walk trough antenna, neck tag transponders, a portable antenna brought near each cow, etc).

The herd ID number can also be entered from the keypad 302 (or other data input devices in alternative embodiments). To enter a herd ID, the SELECT key on the keypad 302 is repeatedly pressed until the COW ID LED (not shown) on the module 304 is illuminated. The display 301 will show "0." The UP or DOWN arrow keys (not shown) on the keypad 302 are pressed until the correct blinking digit value is in the display. The DIGIT SELECT key (not shown) on the keypad 302 is pressed once and the display will show "X0." The "0" will be blinking to indicate that this is the digit that is currently being entered. Using the UP and DOWN arrow keys on the keypad 302 the next digit is entered. This process is repeated until the whole herd ID has been entered. Pressing the SELECT key on the keypad 302 will save the herd ID and return to the milk display. If a mistake is made during entry, pressing the CE key (not shown) on the keypad 302 will let you back up one digit. Pressing the CE key a second time will erase all of the entered digits so that the whole herd ID can be reentered. Alternatively, a numeric keypad allows direct entry of the number.

When all the cows on one side of the parlor have been milked and the exit gate 900 for that side is opened for them to leave, the host computer 400 then communicates with each metering subsystem 300 via the communications interfaces 504, 308 and gets a packet of data from each metering subsystem 300. The data received from each metering subsystem 300 consists of, but is not limited to, the cow ID number, the highest temperature recorded, and the cow's milk production weight. The host computer 400 then goes out to each metering subsystem 300 and resets the Cow ID, temperature, target weight and milk weight to zero.

In an alternative embodiment, an exit gate for each parlor stall can be controlled separately and the host computer 400 can talk to the corresponding metering subsystem 300 for that corresponding stall via the communications interfaces 504 and 308. In yet another embodiment, the program software can perform an "auto gate" function wherein, after the expiration of a certain time period following a triggering event, such as milk flow below the takeoff threshold level, the system will automatically download to the host computer 400 the packet of data for each cow.

The metering subsystem 300 has a built in diagnostic program in the preferred embodiment, which, when enabled, tests the milk sensor 305 and the interface electronics. The diagnostic program of meter circuit board 303 can be accessed when the display 301 is "OFF" and switch 3 (not shown) on meter circuit board 303 is "ON" and switch 4 (not shown) on meter circuit board 303 is "OFF." The following sequence happens when the ON/OFF key (not shown) on the keypad 302 is pressed once.

| KEYBOARD | DISPLAY | FUNCTION | CHANGES |
|---|---|---|---|
| ON/OFF | turn.On | Key pressed | |
| | b.XX.YYY | Comm. parm. | |
| | Changing | Display test of all digits and indicators | |
| SELECT | Probe | Test Head Range = 0–8 | Filling the milk head will show a change in probe level |
| SELECT | AD0.X | Test Raw Temp. Range = 0–255 | UP arrow selects ADI. 100 Deg. F. = 62 +/− 3 |
| | AD1.XXX | Test Amp. Temp Range = 0–255 | DOWN arrow select ADO 100 Deg. F = 100 +/− 20 |
| SELECT | S = 4321 | Switch Status | # = ON, _ = OFF |
| SELECT | UAC.ON | Test Vacuum | UP = Output ON |
| | UAC. OFF | Solenoid | DOWN = Output OFF |
| SELECT | Ato.ON | Test Takeoff | UP = Output ON |
| | Ato.OFF | Solenoid | DOWN = Output OFF |
| SELECT | E2.dAtA | Non-volatile Mem. Test START | Hold UP and press |
| | PASS | Memory Good | See note below. |
| | FAIL | Memory Bad | See note below. |
| SELECT | | | Return to display test. |

The non-volatile memory test destroys the contents of the setup data in the memory contained on the new circuit board 303. The controller 303 moves the setup data into an internal memory during the test and restores it when the ON/OFF key (not shown) on the keypad 302 is pressed to exit diagnostics and switch 3 on the water circuit board 303 "OFF" is turned off.

The system is designed to convert the four RS-232 ports (not shown) of a multi-user communications card 501 to optically isolated RS-485 drivers (not shown) and receivers (not shown) contained on the communications card 501 for interfacing to multiple milk metering subsystems 300, multiple exit gate switches 900 and an electronic identification system 600. The multiple meter controller (MMC) 500 includes two printed circuit cards 501 and 502 and their associated cables (not shown). Power for the MMC is provided by the AC line voltage. The MMC 500 will operate on either 50 or 60 Hertz and on either 110 or 220 volts. Connections to the various electronic devices from the MMC 500 is via removable terminal blocks (not shown) and shielded twisted pair data cable (not shown). Alternatives include using other power sources and other communications lines.

The MMC communications card 501 supports eight full duplex (transmit/receive) interfaces in the preferred embodiment. Each port of the communications card 501 supports two interfaces (data and control). The data interface can operate at speeds up to 19,200 baud. The control interface can operate at speeds up to 9600 baud. These interfaces have RS-232 levels (mark=logical "1"=greater than 3 volts, space=logical "0"=less than −3 volts) on the computer side 504 and RS-485 levels (mark=logical "1"=+pin to −pin greater than 200 millivolts differential, space=logical "0"=+ pin to −pin greater than −200 millivolts differential) on the parlor side 308. Each of the eight interfaces has a five pin removable terminal block (not shown) for connection to the external devices. The receivers (not shown) on the communications card 501 of each data interface are biased for operation with all transmitters of the connecting devices disabled (tri-stated logic=open circuit). The receivers (not shown) on the communications card 501 of each control interface are biased for dual operation. The control lines can be used differentially when connected to a RS-485 transmitter or as a contact closure input when the control minus is connected to the shield terminal by a switch. When the control interface receiver on the communications card 501 is used with a switch and the switch is open (off) the output is in a mark (logical "1") state. When the switch is closed (on) the output is in a space (logical "0") state and the amber status indicator on the MMC 500 is lighted. One skilled in the art will recognize that many components other than the particular components used to implement the preferred embodiment may be used.

The MMC 500 has dual built in power supplies 506 and 507. The smaller of the two power supplies 506 powers the RS-232 receivers and transmitters and their half of the opto-isolators contained on the communications card 501. The larger of the two power supplies 507 powers the higher power long line RS-485 (used for remotely locating the computer and/or controller) transmitters and receivers and their half of the opto-isolators as well as the display card 502. Both power supplies 506 and 507 are transient protected on the output and the AC input is transient protected and fused for reliable operation.

The MMC display card 502 is used to display the status of the eight bi-directional interfaces of the communications card 501. The interface status indicators (not shown) are grouped by the port assignments of the communications card 501. Each port has one data interface and one control interface. Each interface has one transmit indicator and one receive indicator on the display card 502. The higher speed data indicators are green and the slower control indicators are yellow (amber). The indicators are "OFF" in the mark state and "On" in the space state.

All power and signal interfacing is through a ribbon cable 508 from the communications card 501.

The four control interfaces, one for each communications card 501 port, can be configured to run on either pair of the standard RS-232 control handshaking signal pairs (Request to Send {RTS}/Clear to Send {CTS} or Data Set Ready {DSR}/Data Terminal Ready {DTR}). Selection of the desired operating pair is accomplished by selecting the appropriate jumper positions on the communications card 501 for each port. The table below shows the position of the jumper referenced to the board (connector pointing down reading left to right) in the preferred embodiment. The jumpers are installed connecting the Control Receive Data (CRD) to either Clear To Send (CTS) or Data Set Ready (DSR) and Control Transmit Data (CTD) to either Request To Send (RTS) or Data Terminal Ready (DTR).

| Port 1 | Port 2 | Port 4 | Port 3 |
| --- | --- | --- | --- |
| CTS RTS | CTS RTS | CTS RTS | CTS RTS |
| CRD CTD | CRD CTD | CRD CTD | CRD CTD |
| DSR DTR | DSR DTR | DSR DTR | DSR DTR |

The functional port assignments for the MMC 500 and the communications card 501 are defined as:

| | | |
| --- | --- | --- |
| Prt1 | TXD | Transmit data to side 1 metering subsystem 300 |
| | RXD | Receive data from side 1 metering subsystem 300 |
| | CTD | Control receive exit gate switch 900 of aide 1 (CTS or DSR) |
| | CRD | Not used (CTS of DSR) |
| Prt2 | TXD | Transmit data to side 2 metering subsystem 300 |
| | RXD | Receive data from side 2 metering subsystem 300 |
| | CTD | Not used (RTS or DTR) |
| | CRD | Control receive of exit gate 900 on switch side 2 (CTS or DSR) |
| Prt3 | TXD | Transmit data to side 3 metering subsystem 300 |
| | RXD | Receive data from side 3 metering subsystem 300 |
| | CTD | Not used (RTS or DTR) |
| | CRD | Control receive of exit gate 900 on switch side 3 (CTS or DSR) |
| Prt4 | TXD | Transit data to side 4 metering subsystem 300 |
| | RXD | Receive data from side 4 metering subsystem 300 |
| | CTD | Not used (RTS or DTR) |
| | CRD | Control receive of exit gate switch 900 on side 4 (CTS or DSR) |

The Identification Interface card (IDI) 700 permits the metering circuit board 303 to be used with the Electronic Identification Reader (ID-R) 600 described below. The IDI 700 includes a communication interface 701 and provides 12 volts DC power 702 to the ID-R 600, and provides added RAM program memory 703 for use by the milk metering subsystem 300.

The IDI 700 is a single printed circuit card that is mounted to the component side of the meter circuit board 303. Interconnects between the meter circuit board 303 and the IDI 700 are accomplished using a 36-pin strip connector (not shown).

A 2K byte wide random access memory 703 has been incorporated to satisfy the additional memory requirements for cow ID interfacing operations. A feedback jumper in the PC layout of the connector permits the meter circuit board 303 to automatically detect when the IDI 700 is present and the additional memory 703 is made available.

The IDI 700 is connected to the ID-R 600 with a three wire twisted pair cable with foil shield and drain wire 606. The suggested cable type is Belden 89503 or equivalent. Terminal assignments are the same whether the meter circuit board 303 is used as a milking station or an Id station. The terminal block (not shown) pin assignments are:

| TB1 Pin 1 | Transmit Data (+) |
|---|---|
| 2 | Transmit Data (−) |
| 3 | Receive Data (+) |
| 4 | Receive Data (−) |
| 5 | Power (+12 VDC) |
| 6 | Power Common |
| 7 | Shield |

Electronic identification of each cow is accomplished by using a transponder 800 (attached either to the cow's ear or on a leg band in the preferred embodiments) and reading the transponder with the ID-R 600 reader. The ID-R 600 reader includes a single printed circuit card 601 connected to an antenna 603 in the preferred embodiment. Power for the ID-R is provided by the meter circuit board 303 via the communication interface card 701 and DC power supply 702.

The circuitry 601 of the ID-R 600 in the preferred embodiment can be broken down into three circuit elements. These circuit elements are a power supply 604, an RF micro reader 602, and a communications interface 605. Each of the circuit elements is described in subsequent paragraphs.

The power supply circuitry 604 of the ID-R 600 generates 5 volts DC to power the logic circuitry of the ID-R 600 and 5 volts DC to power the RF micro reader 602. A linear power supply is used to prevent interference problems with the RF electronics in the preferred embodiment.

The transmitter of the ID-R 600 generates a 132.5 KHZ continuous wave exciter signal which is absorbed by the tuned circuit input of the transponder 800. The 132.5 KHZ frequency is generated by a stable crystal oscillator in the ID-R 600. The high voltage transmit signal is generated by the a power amplifier stage in the ID-R 600 driving a resonant antenna circuit 603 at the 132.5 KHZ frequency.

After transponder 800 has stored sufficient energy to power a complete transmission of its stored transponder ID number, it automatically transmits a 64 bit frame format response. This response is received by the receiving antenna 603, amplified, and filtered by the ID-R circuitry 601. The digital data is then extracted from the RF by the receiver circuitry 601 in the ID-R 600, and sent to the microprocessor in the ID-R 600 for validation.

The communications circuitry in the ID-R 600 contains a four-wire RS-485 transceiver for long line data transmissions to the IDI 700.

The ID-R 600 is connected to the communications interface card 701 with a three-wire twisted pair cable with foil shield and drain wire 606. The suggested cable type is Belden 89503 or equivalent. The terminal block pin assignments are:

| TB1 Pin 1 | Receive Data(+) |
|---|---|
| 2 | Receive Data (−) |
| 3 | Transmit Data (+) |
| 4 | Transmit Data (−) |
| 5 | Power (+12 VDC) |
| 6 | Power Common |
| 7 | Shield |

The antenna 603 interconnection to the ID-R circuit card 601 is a non-removable miniature two pin terminal block (not shown) in order to maintain a low impedance/low capacitance connection. Antenna terminal assignments are:
ANT H Antenna High
ANT L Antenna Low The firmware on the ID-R circuit card 601 is embedded in the purchased Texas Instrument's Micro Reader Module 602. Communication between the ID-R 600 and the IDI 700 is via the RS-485 long line interface 606.

An interrogate command is sent from the meter circuit board 303 via the RS-485 interface 306 to the IDI 700 and then via interconnect 606 to the ID-R 600. The exciter signal is activated until a valid transponder Id is received from the transponder 800 by the ID-R 600. On receipt of the transponder Id, the ID-R 600 will deactivate the exciter on the ID-R circuit card 601, light the Valid LED in the ID-R 600 for a brief period, and then transmit the transponder Id back through the system.

If no acknowledge is received within one half second, the exciter on the ID-R circuit board 601 will be reactivated and the process repeated until an acknowledge is received.

Communication with the ID-R circuit board 601 is one start bit, 8 data bits, no parity and one stop bit at 9600 baud. The ID-R circuit board 601 will transmit, unsolicited, the 16 hexadecimal digit transponder Id with a BCC byte terminating the transmission. Acknowledgment of the transponder Id occurs when the milk meter subsystem 300 receives the correct response from the software program.

A description of the preferred embodiment of the flow meter or sensor, and an alternative environment are described below. The preferred sensor should not be considered limiting.

Figure 2:
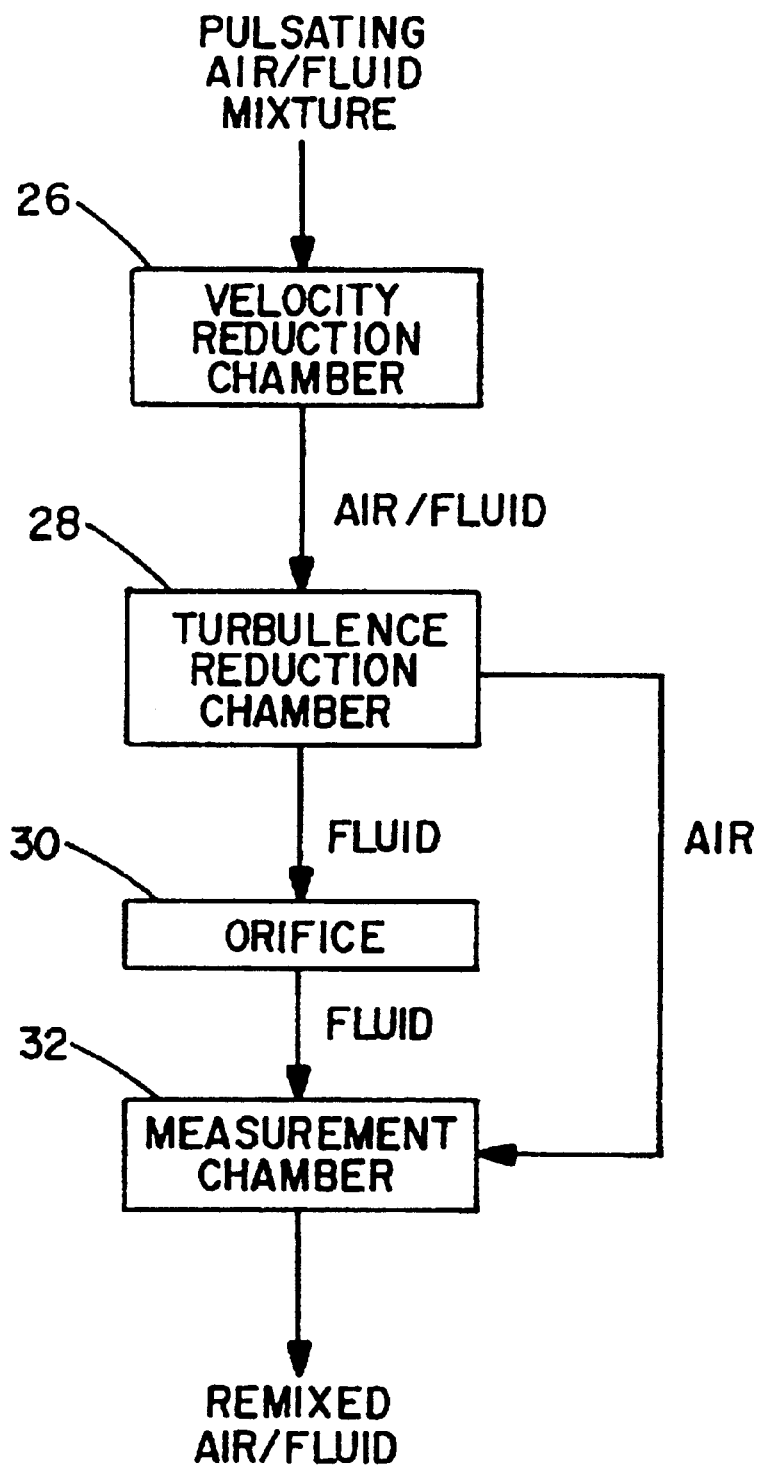
FIG. 2 is a block diagram illustrating the fluid management steps performed within the various chambers of the flow meter of the preferred embodiment of the present invention.

Referring initially to FIG. 1, shown is a flow meter 10 constructed in accordance with a preferred embodiment of the present invention. The flow meter 10 comprises an upper housing member 12 and a lower housing member 14 which in use are sealably coupled about a baffle plate 16 via spring clips 18, 20. As will be explained in greater detail below, the upper and lower housing members 12, 14 are generally hollow in construction and include a variety of internally disposed structures for reducing the turbulent, pulsatile fluid flow from a milk pump 22 into a manageable fluid stream such that an accurate and reliable determination of milk flow rate can be obtained for a cow coupled to a milker 24. More specifically, with reference to FIG. 2, the upper housing member 12 includes a velocity reduction chamber 26, while the lower housing member 14 includes a turbulence reduction chamber 28, a metered orifice 30, and a measurement chamber 32. The velocity reduction chamber 26 is provided to reduce the velocity of the pulsating air/fluid mixture from the pump 22. The turbulence reduction chamber 28 serves to separate the air and fluid from the incoming air/fluid mixture from the velocity reduction chamber 26. The metered orifice 30 is disposed at the entrance of the measurement chamber 32 to provide a clean fluid flow transition from the turbulence reduction chamber 28 to the measurement chamber 32 to aid in proper flow rate determination. The measurement chamber 32 is equipped with a plurality of vertically disposed probe members (not shown) which, in conjunction with a microprocessor 34, track the level of the fluid within the measurement chamber 32 for the purpose of determining instantaneous flow rate. After passing through the measurement chamber 32, the air previously removed in the turbulence reduction chamber 28 is thereafter remixed with the fluid for further transmission to a filter 36 en route to a holding tank 38.

Figure 3:
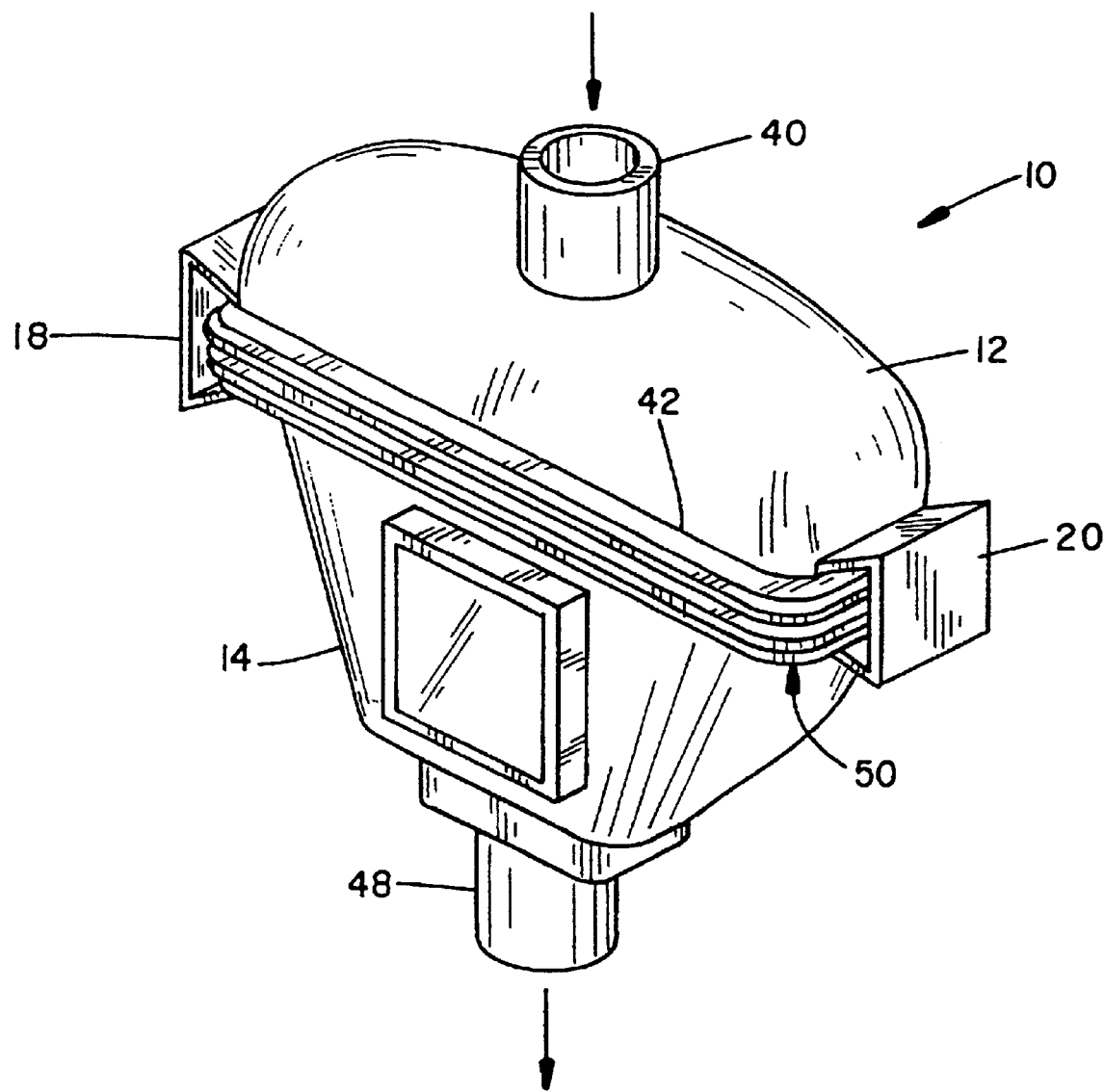
FIG. 3 is a perspective view of the flow meter of the preferred embodiemnt of the present invention.
Figure 4:
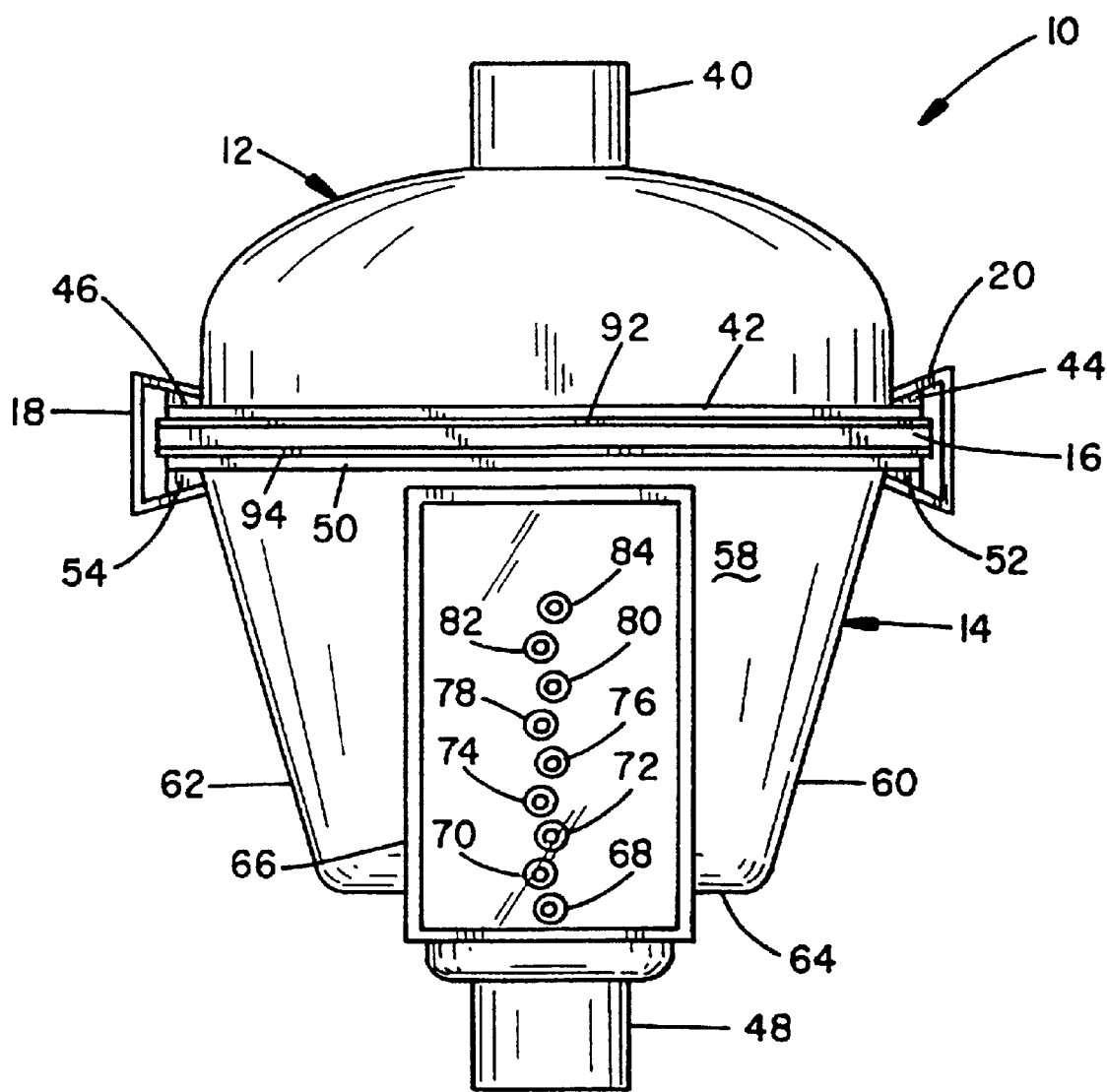
FIG. 4 is an elevation taken from one side of the flow meter.
Figure 5:
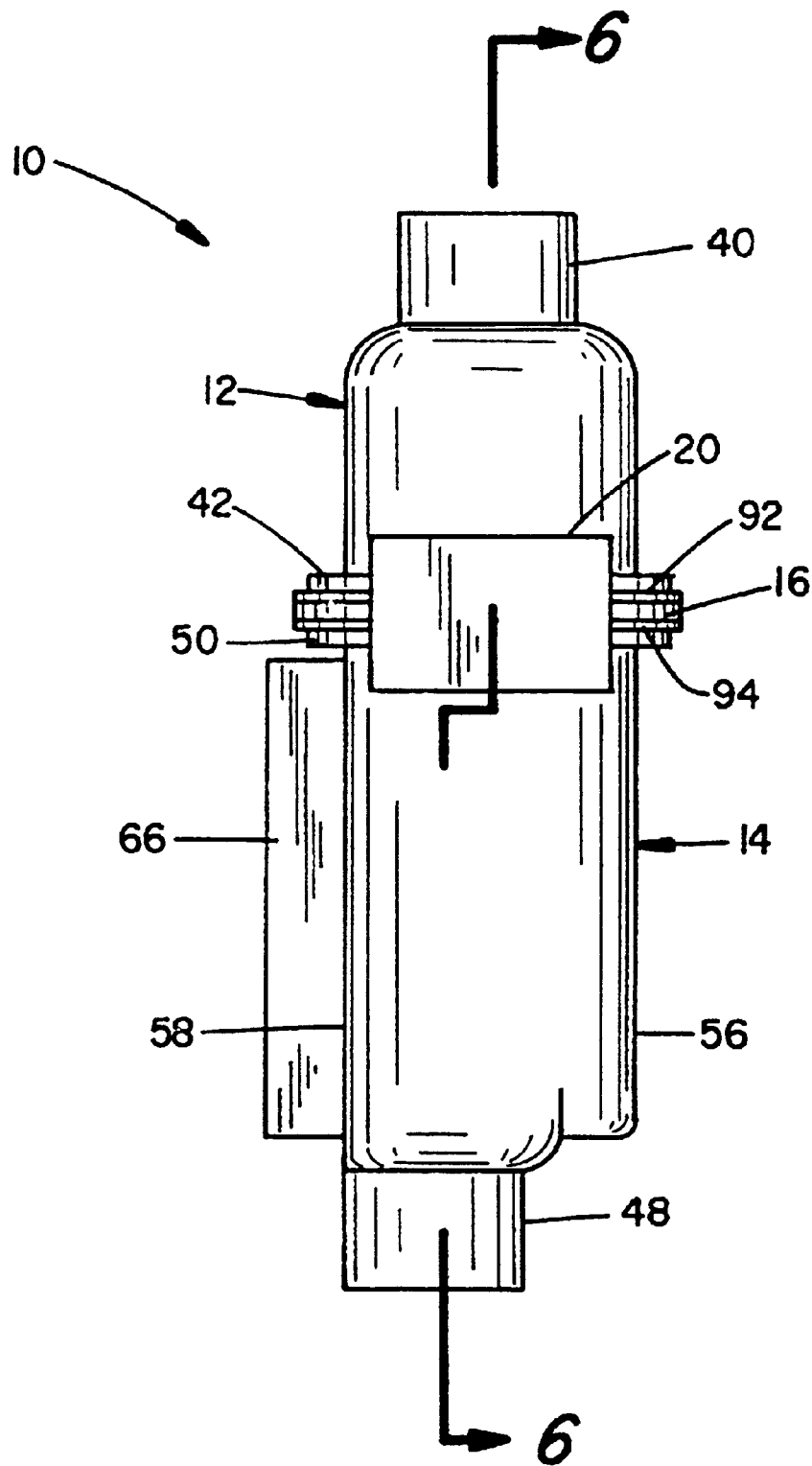
FIG. 5 is an end elevation of the flow meter as viewed in FIG. 4.
Figure 6:
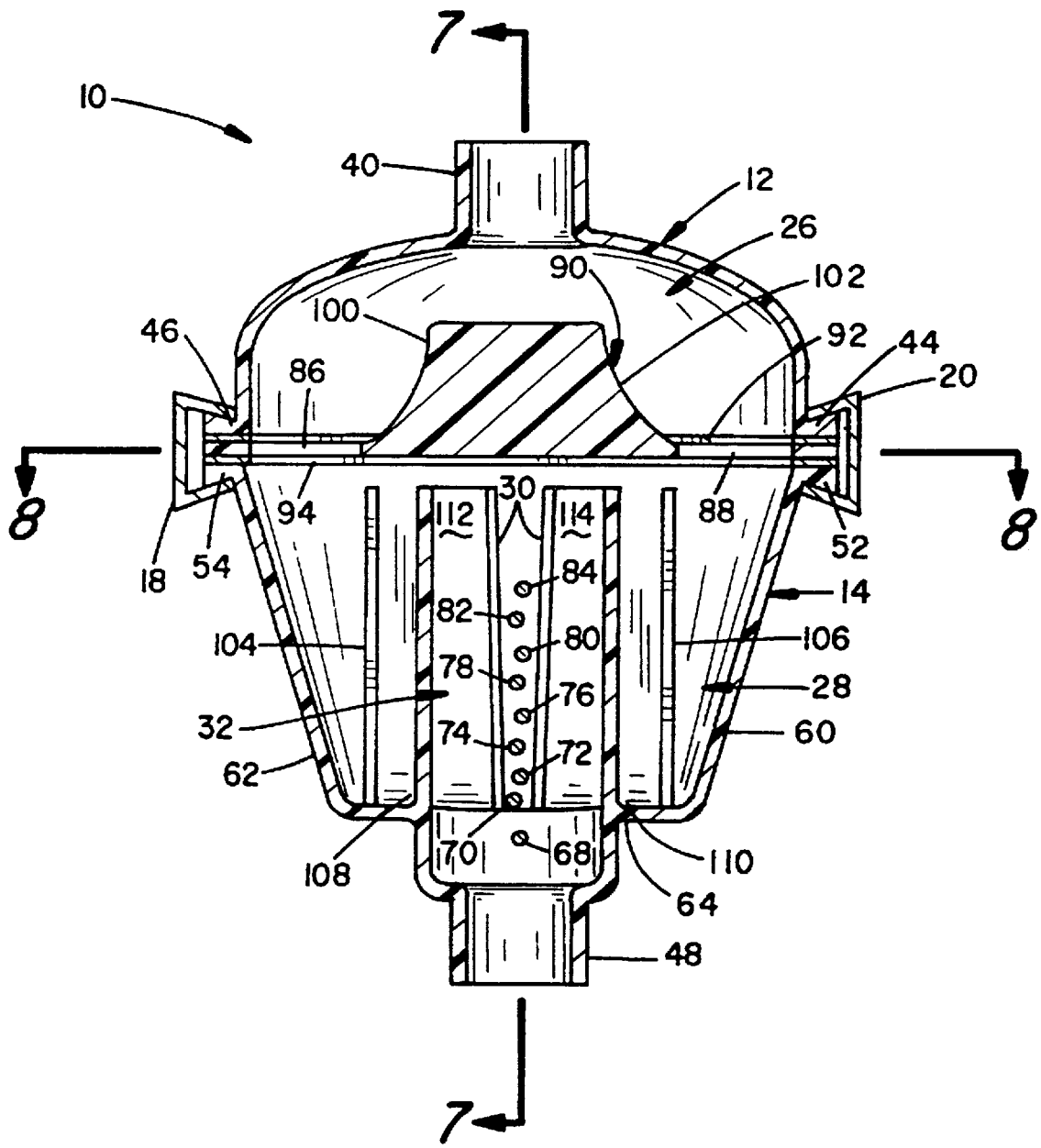
FIG. 6 is a sectional view of the flow meter taken along lines 6—6 in FIG. 5.
Figure 7:
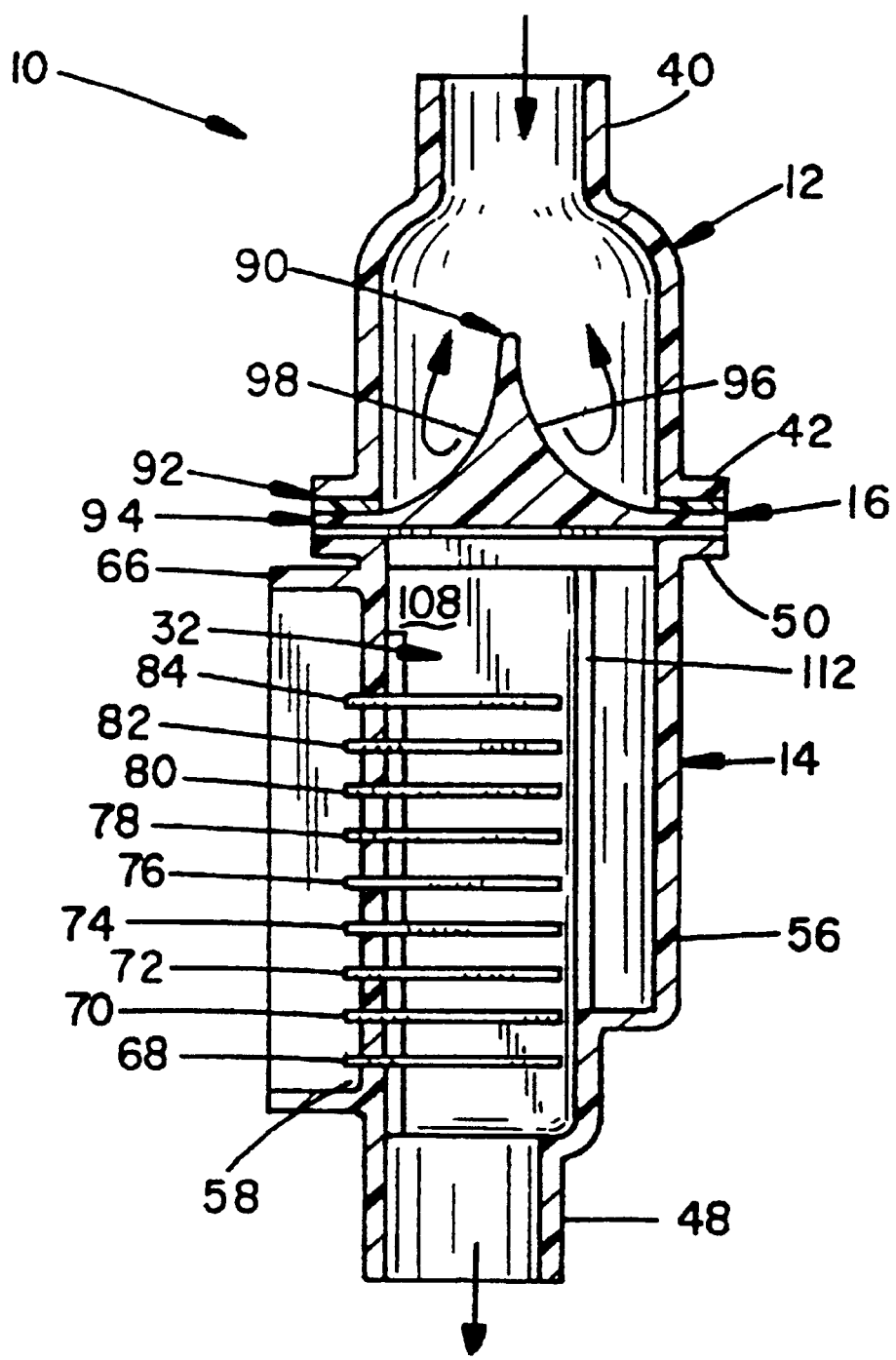
FIG. 7 is a sectional view of the flow meter taken along lines 7—7 in FIG. 6.
Figure 8:
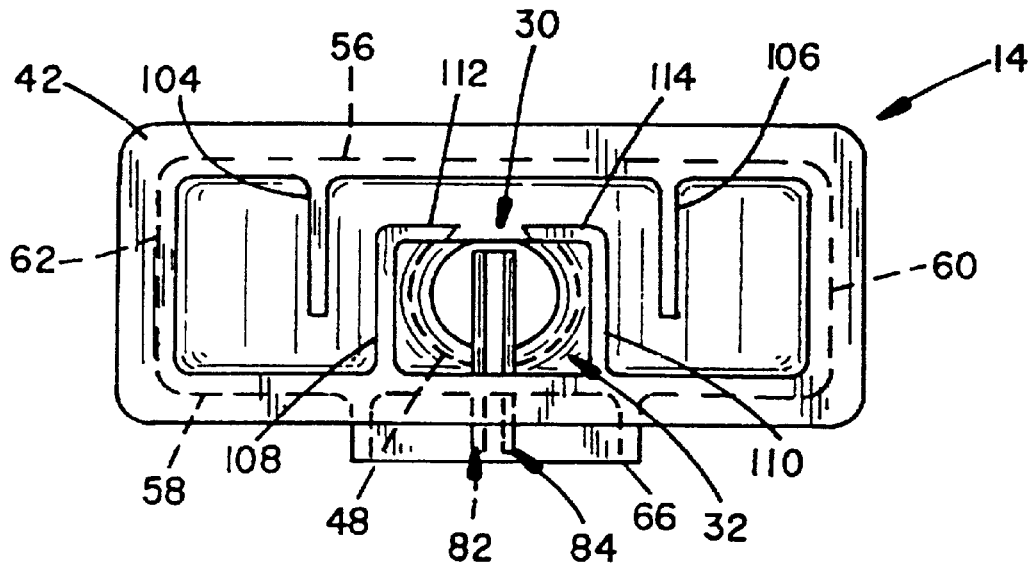
FIG. 8 is a sectional view of the flow meter taken along lines 8—8 in FIG. 6.
Figure 9:
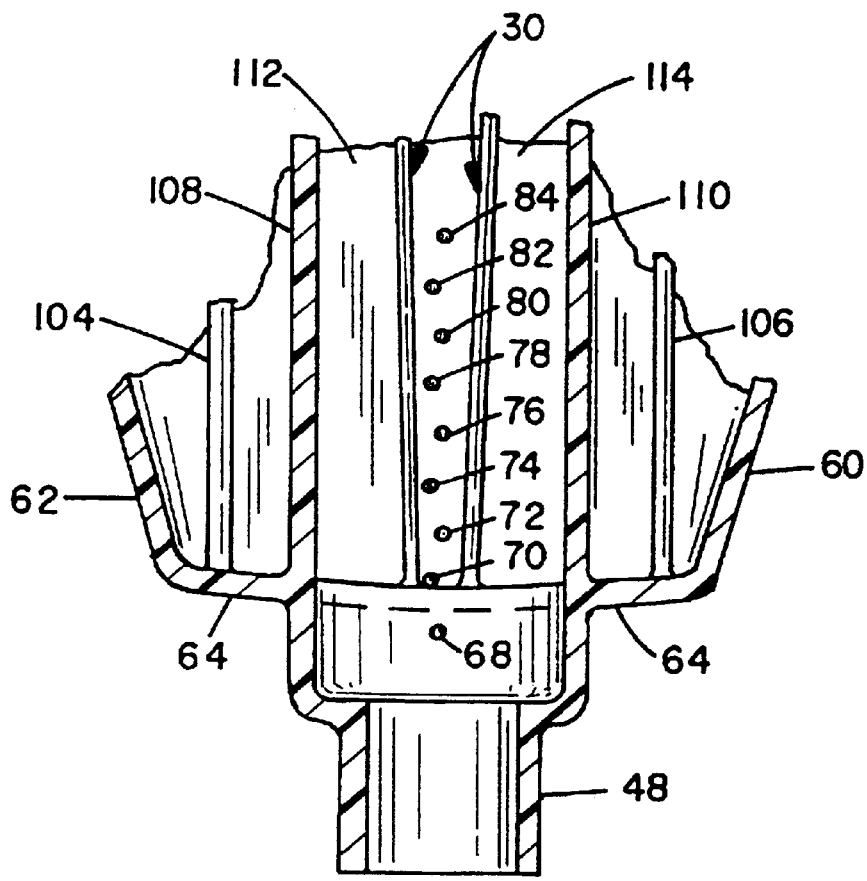
FIG. 9 is an enlarged view of a portion of FIG. 6 illustrating the offset probe arrangement and discharge area of the flow meter.

The structural detail of the exterior of the flow meter 10 will now be described with reference to FIGS. 3–5. The upper housing member 12 is generally dome-like in construction and includes a Fluid inlet 40 and a flange member 42 having generally trapezoidal purchase points 44, 46 for slidably coupling with the upper portions of the spring clips 18, 20. The lower housing member 14 is similarly constructed with a fluid outlet 48 and a flange member 50 having generally trapezoidal purchase points 52, 54 for slidably coupling with the lower portions of the spring clips 18, 20. The lower housing member 14 has generally a front wall member 56 disposed opposite and generally parallel to a rear wall member 58, and opposing side walls 60, 62 which depend angularly inward from the flange member 50 to a bottom member 64. A generally rectangular flange member 66 is provided extending perpendicularly outward from the rear wall member 58. Within the perimeter defined by the flange member 66 are the terminal ends of a base probe member 68, a first probe member 70, a second probe member 72, a third probe member 74, a fourth probe member 76, a fifth probe member 78, a sixth probe member 80, a seventh probe member 82, and an eighth probe member 84. As will be set forth in greater particularity below, the probe members 68–84 are generally cylindrical and extend inward through the rear wall member 58 into the measurement chamber 32. The probe members 68–84 are composed of an electrically conductive material, such as stainless steel, and are disposed in staggered and parallel relation to one another to reduce the likelihood of spanning between probes when the fluid level in the measurement chamber 32 rises and falls due to pulsation. Although not shown, the flange member 66 may be equipped with a protective cover member for enclosing the terminal ends of the probe members 68–84 from the environment.

Turning now to FIGS. 6–9, the structural details of the interior of the flow meter 10 are as follows. The baffle plate 16 is substantially flat having a first and second flow aperture 86, 88 formed therethrough on opposing ends of a centrally disposed and upwardly extending deflection member 90. An upper gasket member 92 and a lower gasket member 94 are provided on either side of the baffle plate 16 so as to establish a fluid tight seal between the baffle member 16 and the upper and lower housing members 12, 14, respectively, when the spring clips 18, 20 are snapped into place over the purchase points 46, 54 and 44, 52. The velocity reduction chamber 26 is defined between the upper housing member 12 and the baffle plate 16. The deflection member 90 has generally arcuate and sloping front 96, back 98, and side surfaces 100, 102 which serve to temporarily deflect the pulsatile incoming fluid as shown in phantom in FIGS. 6 and 7 so as to reduce the overall velocity of the fluid prior to passing through the first and second flow apertures 86, 88 into the turbulence reduction chamber 28. The turbulence reduction chamber 28 is bounded vertically between the baffle member 16 and the bottom member 64, horizontally between the angularly depending side walls 60, 62, and laterally between the front and rear wall members 56, 58. The turbulence reduction chamber 28 includes first and second baffle walls 104, 106 extending in vertically parallel fashion from the front wall member 56 of the lower housing member 14. The first and second flow apertures 86, 88 in the baffle plate 16 are situated such that Fluid passing through the first flow aperture 86 flows directly in the channel defined between the first baffle wall 104 and the side wall 62, while the fluid passing through the second flow aperture 88 flows directly in the channel defined between the second baffle wall 106 and the side was 60. The bottom member 64 slopes downwardly at all points such that the fluid therein is forced to meander around the first and second baffle walls 104, 106 as shown in phantom in FIG. 8, thereby reducing the turbulence of the Fluid prior to passing to the measurement chamber 32.

The measurement chamber 32 comprises an elongated and generally rectangular housing formed by first and second side walls 108, 110 extending inward from the rear wall 58 of the lower housing member 14, a first end wall 112 extending medially inward from the first side wall 108, and a second end wall 114 extending medially inward from the second side wall 110. The opposing edges of the first and second end walls 112, 114 define the metered orifice 30 leading into the measurement chamber 32. The opposing edges of the first and second end walls 112, 114 angle generally inward as they extend from the interior of the measurement chamber 32 towards the turbulence reduction chamber 28. The opposing edges of the first and second end walls 112, 114 also extend from the bottom member 64 of the housing member 14 in a vertically divergent fashion such that the resulting metered orifice 30 has a generally tapered shape. The angling of the opposing edges of the first and second end walls 112, 114 provides a clean transition for the fluid flowing from the turbulence reduction chamber 28 into the measurement chamber 32 and the vertically tapered shape of the metered orifice 30 aids in proper flow rate determinations. The base probe is positioned slightly below the plane of the metered orifice 30 at the approximate horizontal midline of the measurement chamber 32, while probes 70–84 are disposed within the measurement chamber 32 above the bottom plane of the metered orifice 30. As shown particularly in FIGS. 6 and 9, the probes 70–84 are staggered relative to the horizontal midline and are spaced a predetermined and uniform distance from one another. Arranging the probe members 70–84 in staggered fashion reduces the likelihood of spanning between probes when the fluid level in the measurement chamber 39 rises and falls due to pulsation. Disposing the probe members 68–84 equidistant from each other aids in the accurate assessment of fluid level which for proper determination of flow rate.

Figure 10:
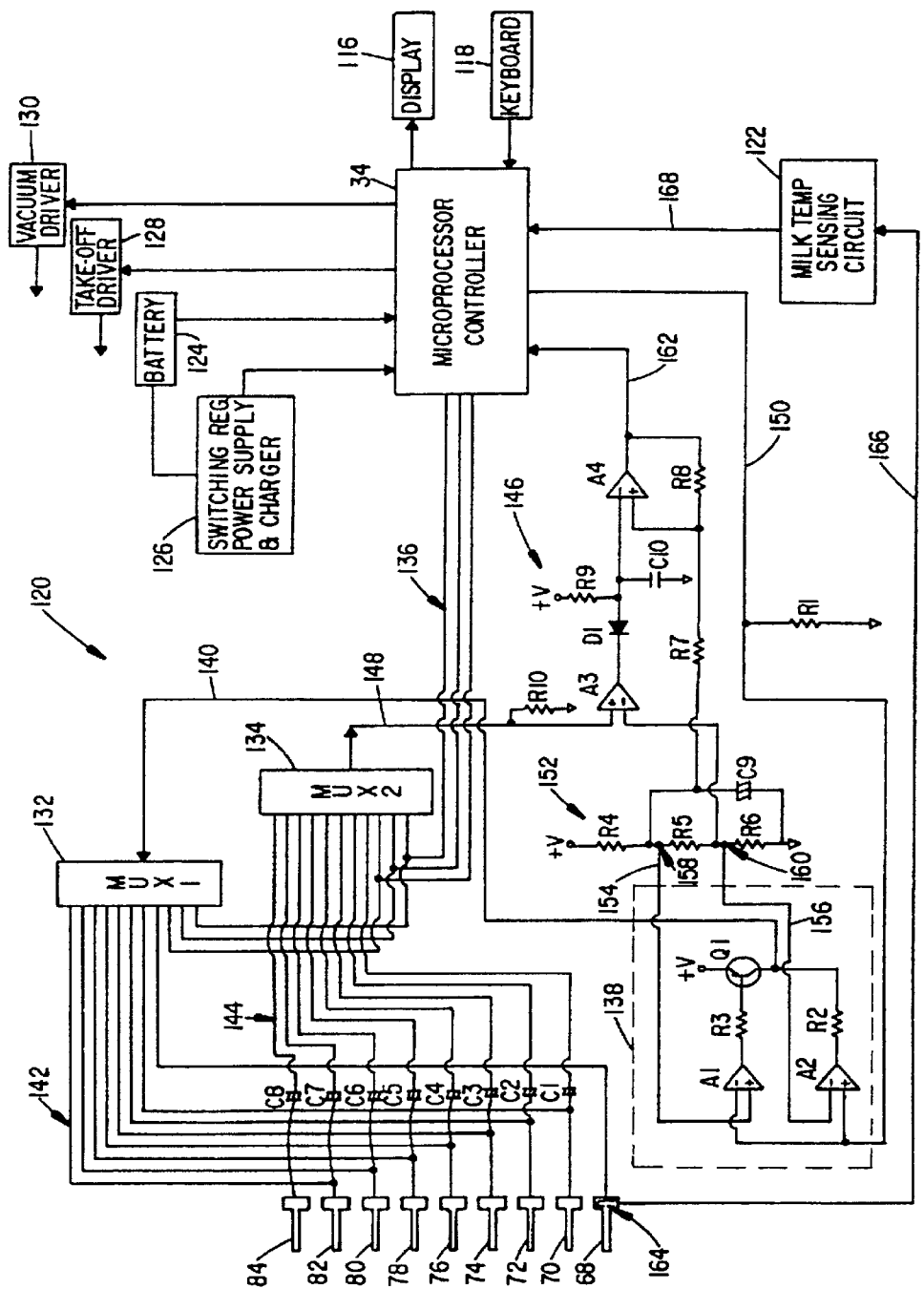
FIG. 10 is a schematic diagram illustrating the control circuit of the flow meter of the present invention.

Referring now to FIG. 10, shown is a schematic diagram of the flow meter illustrating in detail the preferred "adjacent probe" fluid level detection arrangement. The microprocessor controller 34 forms the heart of the control circuit, distributing and receiving various control and data signals to coordinate the overall operation of the flow meter 10. In a preferred embodiment, the microprocessor controller 34 is coupled to a display 116 for communicating information to a user, a keyboard 118 for receiving input from a user, an "adjacent probe" fluid level detection circuit designated generally at 190 for detecting instantaneous fluid level within the measurement chamber 32, and a milk temperature sensing circuit 122 for assessing the temperature of the milk passing through the measurement chamber 32. The microprocessor controller 34 may be powered through the use of either a battery module 124 for mobile operation or a DC power supply 126 for stanchion operation. The microprocessor controller 34 may be optionally coupled to supplemental circuits, such as a take-off driver 128 and a vacuum driver 130, and selectively programmed to detect slow or low flow conditions, as well as various alarm functions.

The "adjacent probe" fluid level detection circuit 120, in cooperation with the microprocessor controller 34, continually tracks fluid level within the measurement chamber 32 by applying a predetermined driving signal to a selected one of the probe members 68–82 while monitoring the immediately superior probe member to determine whether continuity is established therebetween within a given time period. Continuity between the selected pair of adjacent probe members will only be established if the fluid level within the measurement chamber 32 is such that the fluid therein contacts both probe members simultaneously. Therefore, if continuity is detected it indicates that the fluid level within the measurement chamber 32 is at least as high as the uppermost probe member of the selected pair of adjacent probe members. Conversely, if continuity is not detected it indicates that the Fluid level within the measurement chamber 32 is lower than the uppermost probe member of the selected pair of adjacent probe members. Based on this continuity information, the microprocessor controller 34 then selectively re-directs the predetermined driving signal to one of the immediately superior probe member (if continuity was established) and the immediately inferior probe member (if continuity was not established). The aforementioned process is then repeated to assess continuity between the newly selected pair of adjacent probe members to once again gain an indication of fluid level relative to that particular pair of adjacent probe members. The foregoing steps are repeated in quick succession such that the Fluid level within the measurement chamber 32 can be accurately tracked irrespective of the pulsatile, turbulent nature of the Fluid flow. By tracking the fluid level within the measurement chamber 32 in this fashion, the microprocessor controller 34 may easily render a highly accurate determination of flow rate.

A first multiplexer 132 and a second multiplexer 134 are configured to receive probe select input data in parallel from the microprocessor controller 34 via probe select lines 136. The first multiplexer 132 is further coupled to a driving circuit 138 via an input line 140 and to the probe members 68–82 via output lines 142. The second multiplexer 134 is coupled to probe members 70–84 via input lines 144 having filtering capacitors C.-C. disposed there along and to an impedance threshold detection circuit 146 via an output line 148. The driving circuit 138 is coupled to the microprocessor controller 34 via a line 150 and to a voltage reference circuit 152 via lines 154, 156. A current limiting resistor R1 is provided extending between line 150 and ground. The driving circuit 138 includes a first amplifier A1 and a second amplifier A2 configured in a push-pull relationship with a pnp transistor Q1. More specifically, the inverting input of amplifier A1 and the non-inverting input of amplifier A2 are tied together and coupled to line 150, the non-inverting input of amplifier A1 is coupled to a first node 158 of the voltage reference circuit 152, and the inverting input of the amplifier A2 is coupled to a second node 160 of the voltage reference circuit 152. The output of the amplifier A1 and the base of the transistor Q1 are coupled together with a resistor R3. The emitter of the transistor Q1 is tied to power supply +V, while the collector is tied to the output of the amplifier A2 with a resistor R2 and to the first multiplexer 132 via line 140. The voltage reference circuit 152 is a voltage divider having a resistor R4 extending between the power supply +V and the first node 158, a resistor R5 extending between the first node 158 and the second node 160, a resistor R6 extending between the second node 160 and ground, and a capacitor C9 extending from the first node 158 to ground. The second node 160 is coupled directly to the inverting input of an amplifier A3, while the first node 158 is coupled to the non-inverting input of an amplifier A4 via a resistor R7. A resistor R8 further couples the non-inverting input of amplifier A4 to the output thereof for return to the microprocessor controller 34 via line 162. The inverting input of the amplifier A4 is coupled to the output of the amplifier A3 via a diode D1. A resistor R9 is provided between the power supply +V and the anode of diode D1, while a capacitor C10 extends between the anode of diode D1 and ground. The noninverting input of the amplifier A3 is coupled to the second multiplexer 134 via a line 148 which includes a resistor R10 extending to ground.

In operation, the microprocessor controller 34 selectively transmits a pulsed driver enable signal to the driving circuit 138 on line 150. The push-pull arrangement of the driving circuit 138, in turn, generates a driving signal on line 140 for transmission to the first multiplexer 132. The first multiplexer 132 selectively directs the driving signal received on line 140 to a preselected one of the probe members 68–89 depending upon the probe select data being transmitted to the first and second multiplexers 132, 134 on probe select lines 136. Due to the parallel and shifted coupling between the output lines 142 and input lines 144, the second multiplexer 134 establishes electrical communication between the impedance threshold detection circuit 146 and the probe member located immediately superior to the probe member receiving the driving signal from the first multiplexer 132. The impedance threshold detection circuit 146 interrogates the return signal on line 148 to determine whether the driving signal being applied to the lower probe member of the adjacent pair is received at the upper probe member of the adjacent pair during the application of the driving signal It will be appreciated that the driving signal will only be received at the upper probe member of the adjacent pair if electrical continuity is established therebetween. With the probe members 68–84 disposed in a vertically spaced fashion within the measurement chamber 32, electrical continuity between any pair of adjacent probe members will only be established if the fluid level within the measurement chamber 32 is such that fluid establishes a conductive path therebetween. As such, if the driving signal is received at the upper probe member it indicates that the fluid level within the measurement chamber 32 is at least as high as the upper probe member of the selected adjacent pair. Conversely, if the driving signal is not received at the upper probe member it indicates that the fluid level within the measurement chamber 32 is less than the height of the upper probe member. By knowing the vertical location of the probe members 68–84 within the measurement chamber 32, the microprocessor controller 34 is capable of translating this continuity information into an accurate fluid level determination. The microprocessor controller 34, in turn, computes instantaneous flow rate based on the fluid level within the measurement chamber 32, the dimensions of the metered orifice 30, and the dimensions of the fluid outlet 48.

The operation of the impedance threshold detection circuit 146 will now be explained as follows. The signal on the return line 148 will remain in a low or off state unless and until continuity is established between the selected pair of adjacent probe members such that the driving signal applied to the lower probe member of the adjacent pair is received at the upper probe member of the adjacent pair. In a preferred embodiment, the voltage reference circuit 152 is configured such that the voltage level at first node 158 will be approximately two-thirds (2/3) of the supply voltage (+V), while the voltage level at the second node 160 will be approximately one-third (1/3) of the supply voltage (+V). that the second node 160 is tied to the inverting input of amplifier A3, the output of amplifier A3 will therefore remain low until the signal on return line 148 causes a voltage drop across resistor R10 which exceeds the voltage at the second node 160. The amplifier A4 is disposed in a normally high configuration such that the output on line 162 will be maintained in a high state until the voltage level at the inverting input thereof exceeds the voltage level at the non-inverting input thereof. As such, when continuity is not established between the selected adjacent probe members the voltage drop across resistor R10 will not accrue to exceed the voltage level at the inverting input of amplifier A3 and the resulting output of amplifier A3 will therefore be maintained low. The low output of amplifier A3 consequently shorts out the capacitor C10 and maintains the inverting input of amplifier A4 low such that the output signal on line 162 is maintained high. The microprocessor controller 34 interprets this as representing a lack of continuity between the selected adjacent pair of probe members. In the instance that continuity is established between the selected adjacent probe members, the voltage drop across resistor R10 will accrue to point where it exceeds the voltage level at the inverting input of the amplifier A3 such that the resulting output of amplifier A3 will switch into a high state. The moment the output of amplifier A3 switches into a high state capacitor C10 will begin charging. When the charge within capacitor C10 exceeds the voltage level at the non-inverting terminal of amplifier A4, which in the preferred embodiment is the voltage at second node 160, the output signal on line 162 immediately drops to a low state. The time constant of capacitor C10 is preferably chosen such that its charge will only exceed the voltage at the non-inverting input of amplifier A4 if continuity between the adjacent probe members is maintained for a predetermined duration. In this fashion, the capacitor C10 serves as a filter for screening out momentary continuity hits which may be attributable to causes other than the fluid being at that particular level within the measurement chamber 32.

In a preferred embodiment, the driver enable signal will be applied to the driving circuit 138 for a predetermined period of time unless it is determined within that period that continuity has been established between the selected adjacent pair of probe members. If continuity is detected during the application of the driving signal, the microprocessor controller 34 will stop applying the driver enable signal to the driving circuit 138, increment the probe selection by one level, and thereafter re-apply another driver enable signal to the driving circuit 138. With the probe selection incremented by one level, the first multiplexer 132 will direct the new driving signal to the probe member located directly above the probe member which received the previous driving signal, while the second multiplexer 134 will connect the impedance threshold detection circuit 146 to the probe member located immediately superior to the probe member which receives the new driving signal. If continuity between the adjacent pair of probe members is not detected within a predetermined period of time, such as 20 milliseconds, the microprocessor controller 34 will automatically stop applying the driver enable signal to the driving circuit 138, decrement the probe selection by one level, and thereafter re-apply another driver enable signal to the driving circuit 138. In this case, decrementing the probe selection will cause the first multiplexer 132 to direct the new driving signal to the probe member immediately below the probe member which received the previous driving signal and cause the second multiplexer 134 to connect the impedance threshold detection circuit 146 to the probe member located immediately superior to the probe member which receives the new driving signal.

For example, if the preselected pair of adjacent probe members consists of the fourth and fifth probe members 76, 78, the first multiplexer 132 will direct the pulsed driving signal to the fourth probe member 76 while the second multiplexer 134 establishes a communication link between the fifth probe member 78 and the impedance threshold detection circuit 146. The impedance threshold detection circuit 146 then continuously monitors the signal on line 148 to detect whether the driving signal applied to the fourth probe member 76 is being received at the fifth probe member 78. If the driving signal is received at the fifth probe member 78 within a predetermined period, the impedance threshold detection circuit 146 will produce a low output signal on line 162 indicating to the microprocessor controller 34 that continuity has been established between the fourth and fifth probe members 76, 78. The microprocessor controller 34 will then stop applying the driver enable signal on line 150, increment the probe selection by one such that the newly selected adjacent pair consists of the fifth and sixth probe members 78, 80, and re-apply the driver enable signal to the driving circuit 138. In this arrangement, the first multiplexer 132 directs the new driving signal to the fifth probe member 78 and the second multiplexer 134 connects the sixth probe member 80 with the impedance threshold detection circuit 146 for monitoring continuity therebetween. Conversely, if the driving signal is not received at the fifth probe member 78 within a predetermined period the impedance threshold detection circuit 146 will maintain the normally high output signal on line 162 indicating to the microprocessor controller 34 that continuity has not been established between the fourth and fifth probe members 76, 78. The microprocessor controller 34 will consequently decrement the probe selection by one such that the newly selected adjacent pair consists of the third and fourth probe members 74, 76 and thereafter re-apply the driver enable signal to the driving circuit 138. The first multiplexer 132 will therefore direct the new driving signal to the third probe member 74 while the second multiplexer 134 connects the fourth probe member 76 with the impedance threshold detection circuit 146 for monitoring continuity therebetween. The foregoing sequence will be repeated in quick succession such that the microprocessor controller 34 may accurately track the fluid level within the measurement chamber 32 for subsequent calculation of fluid flow.

The milk temperature sensing arrangement will now be described as follows. As shown generally in FIG. 10, the temperature sensing circuit 122 is coupled to a temperature sensing element 164 disposed within a bore formed in the base probe member 68 via a line 166 and to the microprocessor controller 34 via a line 168. Milk temperature is sensed at a point in close proximity to the actual cow being milked to thereby provide an indirect yet accurate assessment of cow temperature. The microprocessor controller 34 monitors the output of the temperature sensing circuit 122 on line 168 and serves to track the milk temperature within the measurement chamber 32 during the milking of each cow. The microprocessor controller 34 may be optionally configured to automatically store all or selective portions of the milk temperature data obtained by the temperature sensing circuit 122. In this fashion, the history for each cow can be analyzed to determine trends and/or indicate which animals should be replaced within the milk production herd. The temperature sensing element 164 can be any number of commercially available linear or non-linear temperature sensing devices, including but not limited to thermistors and temperature dependent resistors.

Figure 11:
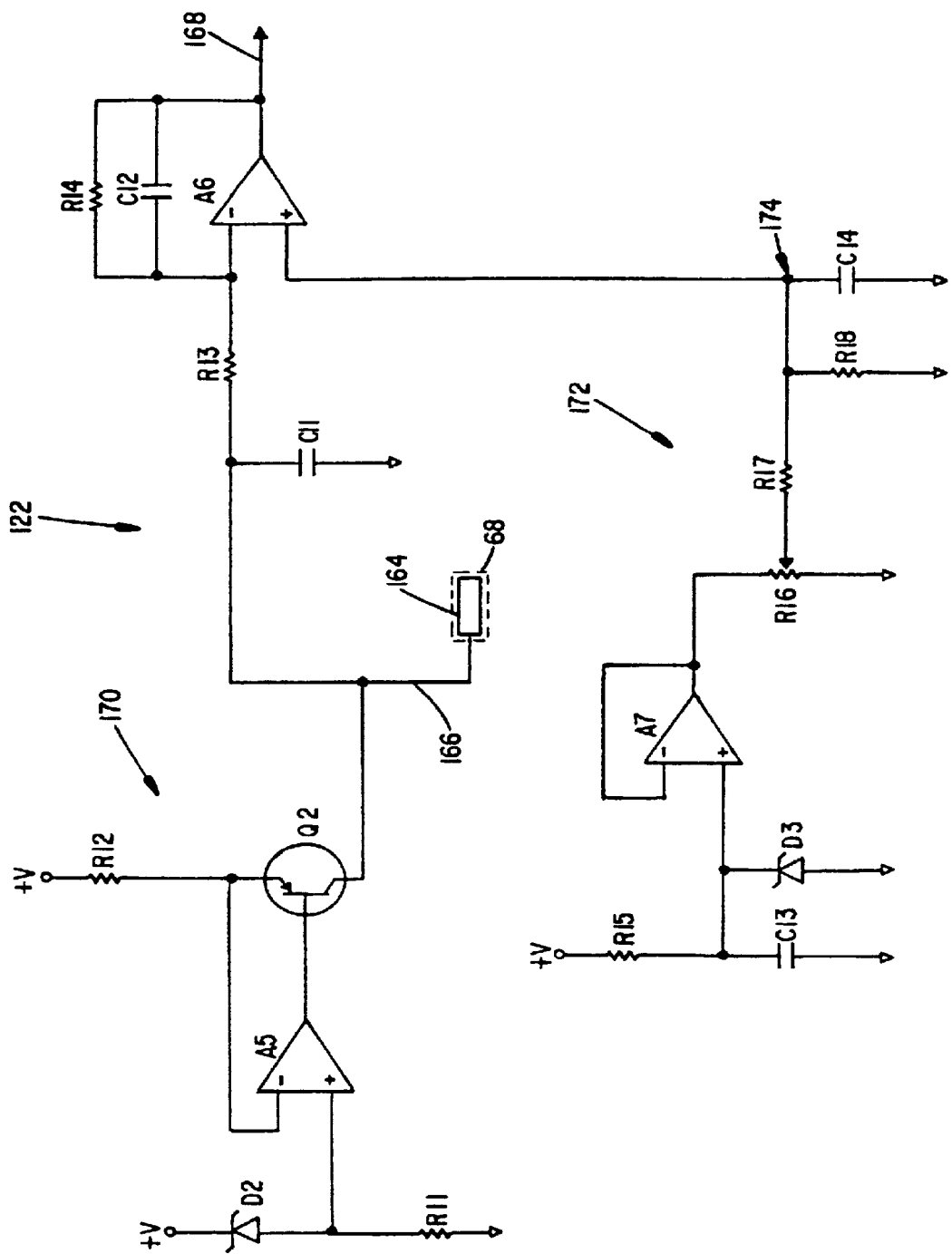
FIG. 11 is a schematic diagram illustrating the milk temperature sensing circuit within the temperature sensing module shown generally in FIG. 10.
Figure 12:
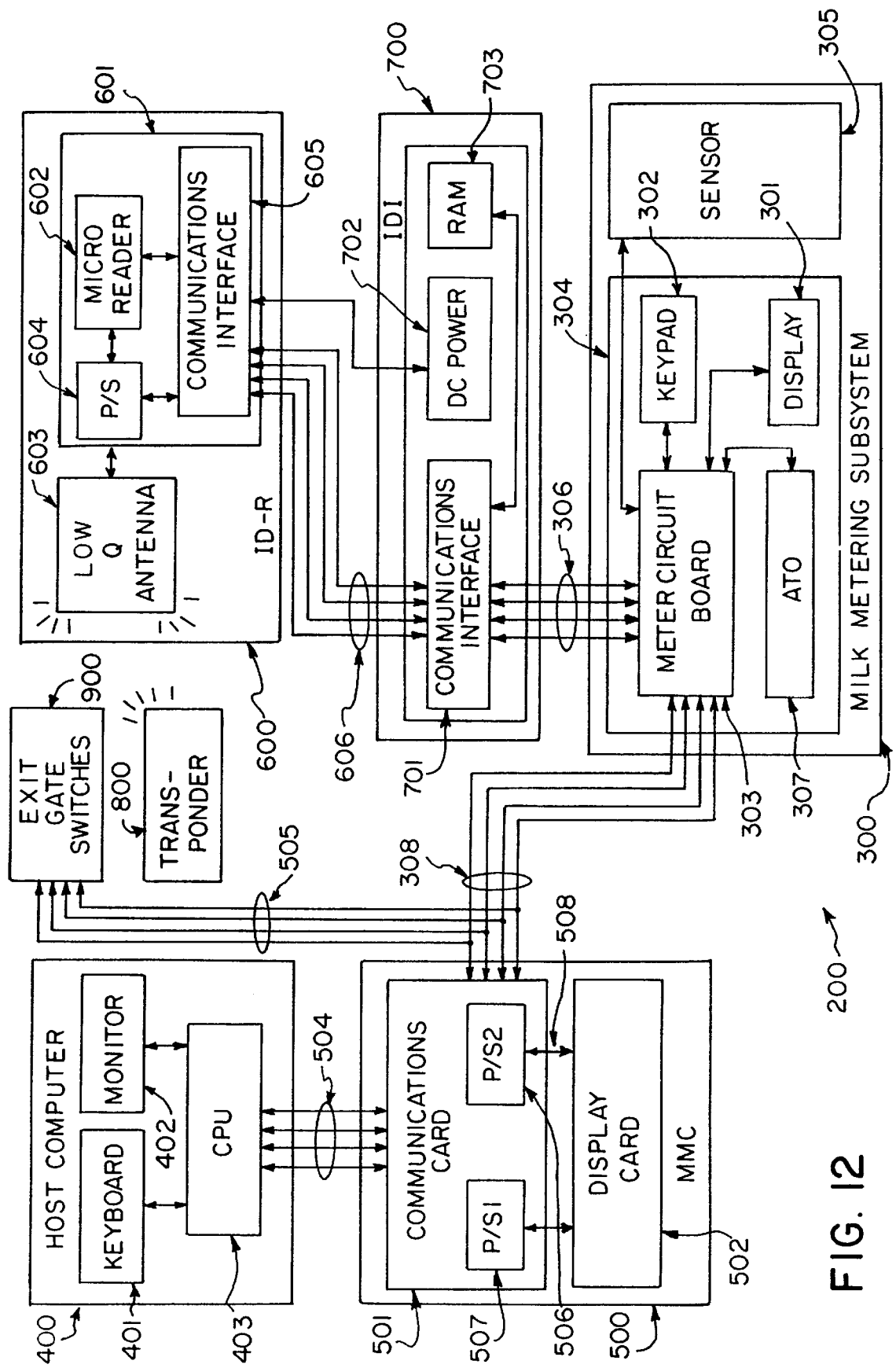
FIG. 12 is a block diagram illustrating of a milk monitoring system and identification system in accordance with the preferred embodiment.
Figure 13:
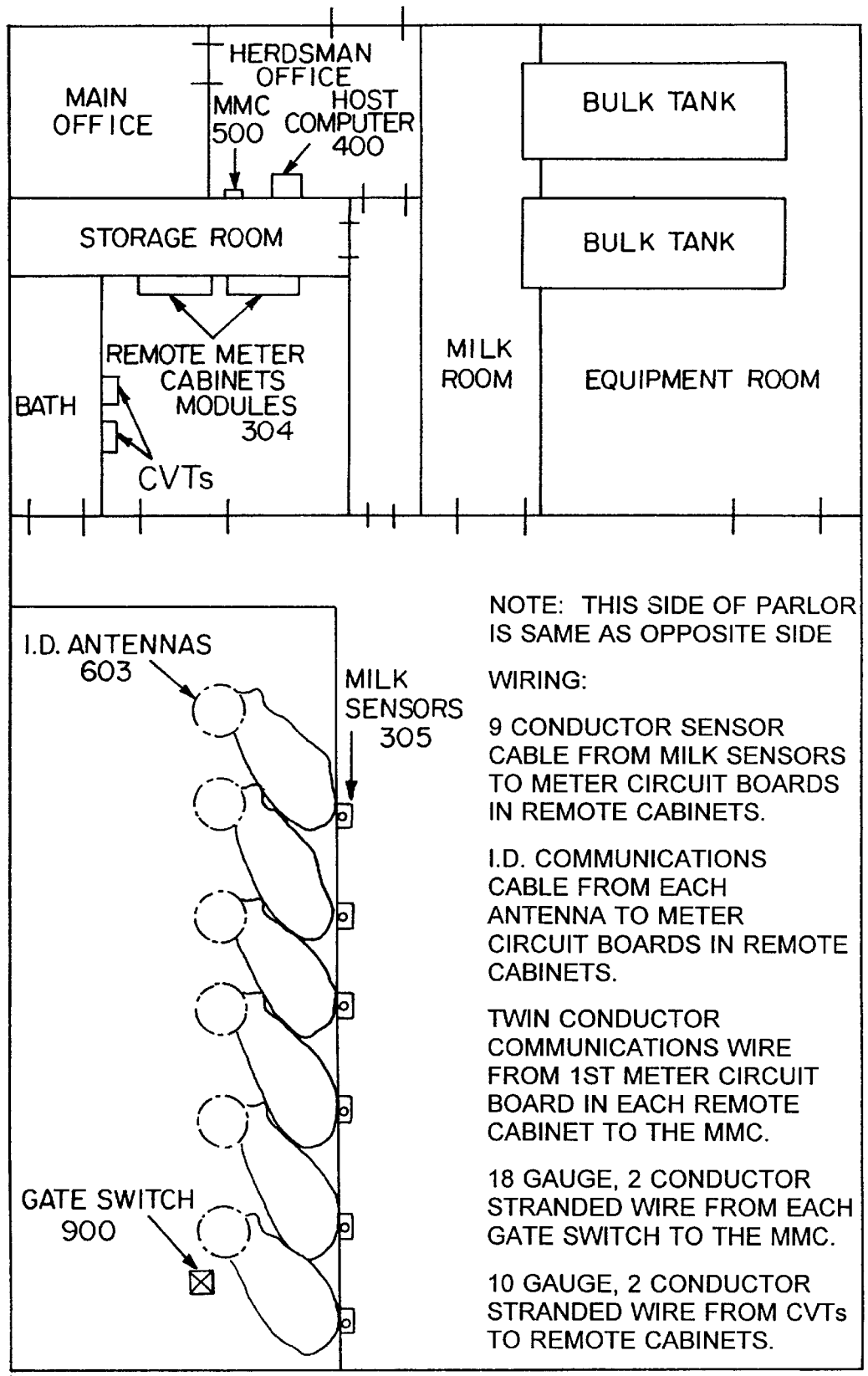
FIG. 13 is a diagram of a typical milking parlor incorporating the preferred embodiment of the milk metering and cow ID system.

With reference to FIG. 11, shown is a schematic diagram illustrating in detail the milk temperature sensing circuit 122 shown generally in FIG. 10. The temperature sensing element 164 is disposed within the base probe member 68 as shown in phantom. A current source circuit 170 is provided including a pnp transistor Q2, an amplifier A5, a zener diode D2, and resistors R11 and R12. The base of the transistor Q2 is tied directly to the output of amplifier A5. The emitter of the transistor Q2 is tied to the inverting input of amplifier A5 and to the power supply (+V) through the resistor R12. The non-inverting input of the amplifier A5 is tied to the junction between the zener diode D2 and the resistor R11, wherein the zener diode D2 is tied to the power supply (+V) and the resistor R11 is tied to ground. The collector of the transistor Q2 is tied to the temperature sensing element 164 via line 166. In addition to being connected to the temperature sensing element 164, the current source circuit 170 is further coupled to the inverting input of an amplifier A6 via a resistor R13 and to a capacitor C11 coupled to ground. The inverting input and the output of the amplifier A6 are coupled together with a resistor R14 disposed in parallel to a capacitor C12. The noninverting input of the amplifier A6 is coupled temperature calibration circuit 172 comprising a resistor R17, a resistor R18, and a capacitor C14. The resistor R18 and capacitor C14 are tied to ground, while the resistor R17 is tied to a potentiometer resistor R16. The potentiometer R16 is further tied to ground and to the output of an amplifier A7. The amplifier A7 is configured as a buffer with the output tied to the inverting input and the noninverting input tied to a resistor R15, a capacitor C13, and a zener diode D3. The capacitor C13 and the zener diode D3 are tied to ground while the resistor R15 is coupled to the power supply (+V).

The voltage signal generated by the temperature sensing element 164 is derived from the constant current source circuit 170. Due to the resulting voltage drop across resistor R13, then, the current level at the inverting input of amplifier A6 varies in proportion to the sensor signal generated by the temperature sensing element 164. The temperature calibration circuit 172 advantageously allows the voltage level at the non-inverting input of amplifier A6 to be selectively set so as to provide a meaningful voltage reference from which accurate temperature measurements may be derived based on the output of the temperature sensing element 164. More specifically, the potentiometer resistor R16 may be selectively adjusted to modify the voltage divider established by the resistors R17 and R18 to thereby produce a specific voltage level at a node 174 coupled to the non-inverting input of the amplifier A6. With the voltage at the non-inverting input maintained at a predetermined level in this fashion, any variations in the voltage level at the inverting input due to temperature changes results in a corresponding change in the analog output from the amplifier A6 In that average cow temperature is approximately 101 degrees Fahrenheit, the temperature calibration circuit 172 is preferably calibrated such that the voltage level at the non-inverting input of the amplifier A6 provides an appropriate reference for covering a temperature range between 90 and 115 degrees Fahrenheit. The microprocessor controller 34 continuously receives the output of the temperature sensing circuit 122 via line 168 and, in a preferred embodiment, samples this output signal on the order of 10 times per second to provide a digital readout of the temperature on the display 116 shown in FIG. 10.

Numerous modifications may be made to the present invention which still fall within the intended scope hereof. Thus, it should be apparent that there has been provided in accordance with the present invention a method and apparatus for metering milk and identifying cows that fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

We claim:

1. A system to be used in a milking parlor having a plurality of stalls wherein the system monitors milk production and identifies each of a plurality of animals being milked, the system comprising:

a plurality of milk metering subsystems, wherein each of the plurality of milk metering subsystems is assigned to one of the plurality of stalls such that there is a one to one correspondence between each of the plurality of milk metering subsystems and each of the plurality of stalls;

a host computer wherein the host computer manages the flow of data throughout the system and further wherein the host computer manages the milk metering subsystems;

at least one antenna in electrical communication with the host computer and further disposed to receive animal identification data corresponding to each of the plurality of animals; and a system interface between the host computer and each milk metering subsystem.

2. The system of claim 1 further comprising a plurality of transponders for providing animal identification data to the at least one antenna wherein each of the plurality of transponders is assigned to one of the plurality of animals such that there is a one to one correspondence between each of the plurality of transponders and each of the plurality of animals.

3. The system of claim 2 wherein each transponder is located on an ear of the animal to which the transponder is assigned.

4. The system of claim 1 wherein the system further comprises a system RS-485 connection between each of the plurality of milk metering subsystems and the system interface.

5. The system of claim 1 wherein the at least one antenna is a plurality of antennas wherein each of the plurality of antennas is assigned to one of the plurality of stalls such that there is a one to one correspondence between each of the plurality of antennas and each of the plurality of stalls.

6. The system of claim 5 further comprising a plurality of transponders for providing animal identification data to the plurality of antennas wherein each of the plurality of transponders is assigned to one of the plurality of animals such that there is a one to one correspondence between each of the plurality of transponders and each of the plurality of animals.

7. The system of claim 6 wherein each transponder is located on an ear of the animal to which the transponder is assigned.

8. The system of claim 5 wherein the system further comprises a system RS-485 connection between each of the plurality of milk metering subsystems and the system interface.

9. The system of claim 5 wherein the system further comprises an antenna RS-485 connection between each milk metering subsystem and each antenna assigned to a common stall.

10. The system of claim 1 wherein the system interface is not located near the plurality of milk metering subsystems.

11. The system of claim 10 wherein the at least one antenna is a plurality of antennas wherein each of the plurality of antennas is assigned to one of the plurality of stalls such that there is a one to one correspondence between each of the plurality of antennas and each of the plurality of stalls.

12. The system of claim 11 wherein the system further comprises a system RS-485 connection between each of the plurality of milk metering subsystems and the system interface.

13. The system of claim 11 wherein the system further comprises an antenna RS-485 connection between each milk metering subsystem and each antenna assigned to a common stall.

14. The system of claim 1 wherein each milk metering subsystem further comprises meter electronics and further wherein at least a portion of the meter electronics for at least one of the plurality of milk metering subsystems is located outside of the milking parlor.

15. The system of claim 14 wherein the system further comprises a system RS-485 connection between the meter electronics and the system interface.

16. The system of claim 14 wherein the at least one antenna is a plurality of antennas wherein each of the plurality of antennas is assigned to one of the plurality of stalls such that there is a one to one correspondence between each of the plurality of antennas and each of the plurality of stalls.

17. The system of claim 16 wherein the system further comprises a system RS-485 connection between the meter electronics and the system interface.

18. The system of claim 16 wherein the system further comprises an antenna RS-485 connection between each milk metering subsystem and each antenna assigned to a common stall.

19. The system of claim 1 wherein at least one milk metering subsystem further comprises a temperature sensor disposed to sense the temperature of milk flowing through the milk metering subsystem.

20. The system of claim 19 wherein the at least one milk metering subsystem further comprises a meter and further wherein the temperature sensor is located inside of the meter.

21. The system of claim 1 wherein at least one milk metering subsystem further comprises a temperature sensor disposed to sense the temperature of wash solution flowing through the milk metering subsystem.

22. The system of claim 21 wherein the temperature sensor is further disposed to sense the temperature of milk flowing through the milk metering subsystem.

23. The system of claim 22 wherein the at least one milk metering subsystem further comprises a meter and further wherein the temperature sensor is located inside of the meter.

24. The system of claim 1 wherein the milk metering subsystem further comprises a piezo electric keypad.

25. The system of claim 1 further comprising means for triggering the transfer of milk production data to the host computer.

26. The system of claim 1 further comprising means for automatically transferring milk production data to the host computer after the expiration of a time period following a triggering event.

27. The system of claim 1 further comprising means for transferring milk production data to the host computer during the milking shift for each animal.

28. A system to be used in a milking parlor having a plurality of stalls wherein the system monitors milk production and identifies each of a plurality of animals being milked, the system comprising:

a plurality of milk metering subsystem means for monitoring milk production, wherein each of the plurality of milk metering subsystem means is assigned to one of the plurality of stalls such that there is a one to one correspondence between each of the plurality of milk metering subsystem means and each of the plurality of stalls;

a host computer means for managing the flow of data throughout the system and for managing the milk metering subsystem means;

at least one antenna means in electrical communication with the host computer means for receiving animal identification data corresponding to each of the plurality of animals; and a system interface means for interfacing between the host computer means and each milk metering subsystem means.

29. The system of claim 28 further comprising a plurality of transponder means for providing animal identification data to the at least one antenna means wherein each of the plurality of transponder means is assigned to one of the plurality of animals such that there is a one to one correspondence between each of the plurality of transponder means and each of the plurality of animals.

30. The system of claim 29 wherein each transponder means is located on an ear of the animal to which the transponder means is assigned.

31. The system of claim 28 wherein the system further comprises a system means for connecting each of the plurality of milk metering subsystem means and the system interface means.

32. The system of claim 28 wherein the at least one antenna means is a plurality of antenna means for receiving animal identification data wherein each of the plurality of antenna means is assigned to one of the plurality of stalls such that there is a one to one correspondence between each of the plurality of antenna means and each of the plurality of stalls.

33. The system of claim 32 further comprising a plurality of transponder means for providing animal identification data to the plurality of antenna means wherein each of the plurality of transponder means is assigned to one of the plurality of animals such that there is a one to one correspondence between each of the plurality of transponder means and each of the plurality of animals.

34. The system of claim 33 wherein each transponder means is located on an ear of the animal to which the transponder means is assigned.

35. The system of claim 32 wherein the system further comprises a system means for connecting each of the plurality of milk metering subsystem means and the system interface means.

36. The system of claim 32 wherein the system further comprises antenna means for connecting each milk metering subsystem means and each antenna means assigned to a common stall.

37. The system of claim 28 wherein the system interface means is not located near the plurality of milk metering subsystem means.

38. The system of claim 37 wherein the at least one antenna means is a plurality of antenna means for receiving animal identification data wherein each of the plurality of antenna means is assigned to one of the plurality of stalls such that there is a one to one correspondence between each of the plurality of antenna means and each of the plurality of stalls.

39. The system of claim 38 wherein the system further comprises a system means for connecting each of the plurality of milk metering subsystem means and the system interface means.

40. The system of claim 38 wherein the system further comprises antenna means for connecting each milk metering subsystem means and each antenna means assigned to a common stall.

41. The system of claim 28 wherein each milk metering subsystem means further comprises meter electronics and further wherein at least a portion of the meter electronics for at least one of the plurality of milk metering subsystem means is located outside of the milking parlor.

42. The system of claim 41 wherein the system further comprises a system means for connecting the meter electronics and the system interface means.

43. The system of claim 41 wherein the at least one antenna means is a plurality of antenna means for receiving animal identification data wherein each of the plurality of antenna means is assigned to one of the plurality of stalls such that there is a one to one correspondence between each of the plurality of antenna means and each of the plurality of stalls.

44. The system of claim 43 wherein the system further comprises a system means for connecting the meter electronics and the system interface means.

45. The system of claim 43 wherein the system further comprises antenna means for connecting the meter electronics and each antenna means assigned to a common stall.

46. The system of claim 28 wherein at least one milk metering subsystem means further comprises a temperature sensing means for sensing the temperature of milk flowing through the milk metering subsystem means.

47. The system of claim 46 wherein the at least one milk metering subsystem means further comprises a meter and further wherein the temperature sensing means is located inside of the meter.

48. The system of claim 28 wherein at least one milk metering subsystem means further comprises a temperature sensing means for sensing the temperature of wash solution flowing through the milk metering subsystem means.

49. The system of claim 48 wherein the temperature sensing means is also a means for sensing the temperature of milk flowing through the milk metering subsystem means.

50. The system of claim 49 wherein the at least one milk metering subsystem means further comprises a meter and further wherein the temperature sensing means is located inside of the meter.

* * * * *